United States Patent
Pardini

(10) Patent No.: US 11,613,827 B2
(45) Date of Patent: Mar. 28, 2023

(54) SILICONE OIL ELIMINATION FROM SPANDEX POLYMER SPINNING SOLUTIONS

(71) Applicant: INVISTA TEXTILES (U.K.) LTD., Manchester (GB)

(72) Inventor: Steven P. Pardini, Harrisonburg, VA (US)

(73) Assignee: The LYCRA Company LLC, Wilmington, DE (US)

( * ) Notice: Subject to any disclaimer, the term of this patent is extended or adjusted under 35 U.S.C. 154(b) by 504 days.

(21) Appl. No.: 16/320,240

(22) PCT Filed: Apr. 11, 2017

(86) PCT No.: PCT/US2017/027000
§ 371 (c)(1),
(2) Date: Jan. 24, 2019

(87) PCT Pub. No.: WO2018/022152
PCT Pub. Date: Feb. 1, 2018

(65) Prior Publication Data
US 2019/0301056 A1    Oct. 3, 2019

Related U.S. Application Data

(60) Provisional application No. 62/368,444, filed on Jul. 29, 2016.

(51) Int. Cl.
*D01F 6/70*    (2006.01)
*C08G 18/61*    (2006.01)
(Continued)

(52) U.S. Cl.
CPC ............... *D01F 6/70* (2013.01); *C08G 18/12* (2013.01); *C08G 18/61* (2013.01); *D01D 5/04* (2013.01); *D01F 1/10* (2013.01); *D01F 6/72* (2013.01)

(58) Field of Classification Search
CPC .. D01F 6/72; D01F 6/70; C08G 18/61; C08G 18/12
See application file for complete search history.

(56) References Cited

U.S. PATENT DOCUMENTS 3,419,653 A    12/1968    Briggs et al. ............... 264/204
3,725,000 A    4/1973    Campbell et al. ............ 8/115.6
(Continued)

FOREIGN PATENT DOCUMENTS

JP    7-224138    †    8/1995
JP    07224138 A    *    8/1995    ............ C08G 18/61
(Continued)

OTHER PUBLICATIONS

JP-07224138-A_08-1995_English.*
(Continued)

*Primary Examiner* — Michael L Leonard

(57) ABSTRACT

A method of making polyurethane or polyurethane urea strands containing siloxane in the polyurethane or polyurethane urea backbone including the steps of: (a) reacting a macroglycol with a diisocyanate to form a prepolymer; (b) reacting the prepolymer with a diamine to form a spinning solution; (c) spinning the spinning solution to form polyurethane or polyurethane urea strands, wherein: i. a diol-polydimethylsiloxane is reacted with the macroglycol and the diisocyanate in step (a); ii. a diamine-polydimethylsiloxane is reacted with the prepolymer prior to the reaction of the prepolymer with the diamine in step (b); or iii. a diamine-polydimethylsiloxane is reacted at the same time as the prepolymer and diamine in step (b), and wherein the polyurethane or polyurethane urea strands comprise less than or equal to 6% of siloxane by weight based on the weight of the polyurethane or polyurethane urea strands and elastic fibers made thereby. An elastic fiber including two or more polyurethane or polyurethane urea strands including (Continued)

siloxane in the polyurethane or polyurethane urea backbone that are bundled together, wherein the siloxane is present in an amount of greater than or equal to 0.01% and less than or equal to 4.0% by weight based on the weight of the fiber. In some aspects, the siloxane is free of urethane radicals.

3 Claims, 1 Drawing Sheet

(51) Int. Cl.
| | |
|---|---|
| *D01D 5/04* | (2006.01) |
| *D01F 1/10* | (2006.01) |
| *D01F 6/72* | (2006.01) |
| *C08G 18/12* | (2006.01) |

(56) References Cited

U.S. PATENT DOCUMENTS

| | | | | |
|---|---|---|---|---|
| 5,723,080 | A | * 3/1998 | Bruner | D01F 6/70 264/103 |
| 6,284,371 | B1 | 9/2001 | Kausch et al. | 428/364 |
| 8,759,467 | B2 † | 6/2014 | Taniguchi | |
| 2002/0161114 | A1 † | 10/2002 | Gunatillake | |
| 2012/0277394 | A1 * | 11/2012 | Taniguchi | C08G 18/12 528/28 |
| 2014/0148537 | A1 * | 5/2014 | Suzuki | D01F 6/70 524/186 |

FOREIGN PATENT DOCUMENTS

| | | | | |
|---|---|---|---|---|
| JP | 2014077120 A | * | 5/2014 | C08G 18/44 |
| JP | 2014-193945 | † | 10/2014 | |
| WO | 2012/020068 | † | 2/2012 | |

OTHER PUBLICATIONS

JP-2014077120-A_05/2014_English.*
International Search Report and Written Opinion in PCT/US2017/027000 dated Jun. 27, 2017.
International Preliminary Report on Patentability in PCT/US2017/027000 dated Jan. 29, 2019.

* cited by examiner
† cited by third party

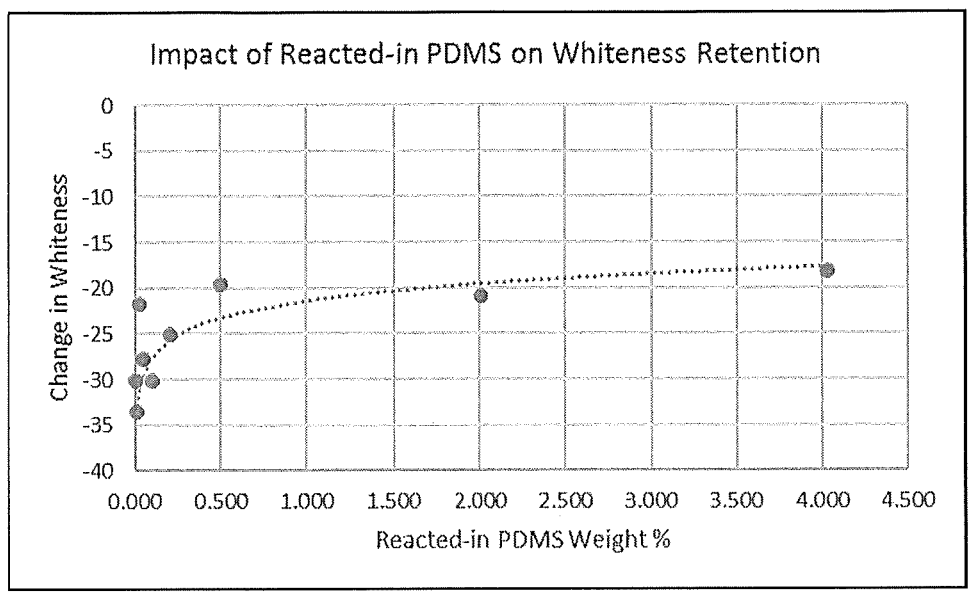

SILICONE OIL ELIMINATION FROM SPANDEX POLYMER SPINNING SOLUTIONS

FIELD OF THE INVENTION

The invention relates to dry-spun, wet-spun, or melt-spun, spandex polymers, having improved spinning performance and fiber or yarn properties when spun in the absence of spinning-process aids such as silicone oil ("polydimethylslioxane" or "PDMS") or magnesium stearate ("MgSt"). More particularly this invention relates to incorporation of a siloxane, such as PDMS, as a non-volatile component of the spandex polymer-chain backbone via a hydroxyl-terminated siloxane used in the urethane-forming, capping reaction, or an amine-terminated siloxane used in the urea-forming, chain-extension reaction.

BACKGROUND OF THE INVENTION

Spandex is known to display increased tackiness as compared to conventional, inelastic fibers. Because of their increased tackiness, spandex filaments may cohere to each other or alternatively adhere to various surfaces during or after manufacture.

Attempts have been made in the past to prepare spandex fibers from spandex polymer solution via spinning processes in the absence of spin aids such as spun-in silicone oil (PDMS) or spun-in magnesium stearate (MgSt). These attempts have not been successful due to the unacceptable spinning performance (e.g., pre-mature filament twinning, cell breaks, fiber sticking to spin-cell walls, yarn out of coalescence jets, and yarn flicking in the coalescence jets) and poor yarn properties (poor tensile properties, poor cohesion, and high along-end denier variability). The addition of small amount of PDMS or MgSt, which blooms to the fiber surface in the spin cell, changes the fiber surface energy and frictional properties.

The presence of about 0.5% spun-in PDMS or MgSt has been found to greatly reduce pre-mature filament twinning, fiber sticking to spin-cell walls, yarn out of coalescence jets, and yarn flicking in the coalescence jets. Unfortunately, the addition of PDMS to the polymer spin solution has resulted in slurry make-up and stability problems (especially slurries containing stearates). In addition, PDMS comes out of the polymer solution and shows up in the dimethylacetamide (DMAc) solvent condensate at the exit of the spin cell. The removal of PDMS from DMAc, in the DMAc recovery process, is an energy intensive and costly process.

Currently spandex fiber producers either add PDMS or MgSt to the spin solution. As discussed above, the spun-in silicone oil approach results in problems with slurry quality and increased DMAc recovery cost.

The spun-in MgSt approach has been found to greatly reduce pre-mature filament twinning, fiber sticking to spin-cell walls, yarn out of coalescence jets, and yarn flicking in the coalescence jets. The MgSt, which blooms to the fiber surface in the spin cell (changing the fiber surface energy and frictional properties), is a non-volatile additive. However, the disadvantage of the MgSt approach is that MgSt has a low melting point and must be injected at about 50° C. and must be spun at about 50° C. spin solution temperatures to maintain the MgSt in a liquid state. Further, the MgSt-containing spin solution must not be heated then cooled; doing so results in dissolution of the MgSt followed by recrystallization, which produces in an unacceptably high rate of solution-filter fouling and unacceptably short solution-filter life. These MgSt temperature limits are not suitable for certain spandex spinning processes. In addition, the use of MgSt as a spin process aid has been shown to shorten spinneret life (due to the deposit of insoluble materials in the spinneret capillaries) and cause poor spinning continuity (yarn spin-cell breaks).

U.S. Pat. No. 3,725,000 discloses a spandex composition having reacted therewith a lubricating finish which is a siloxane. The siloxane used has a general formula of:

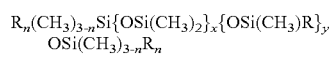

wherein y is an integer, R is

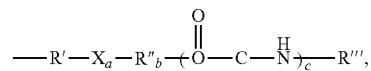

and c is 1 or 2. Thus, the siloxanes used must contain a urethane radical i.e.

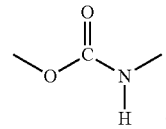

Moreover, the disclosure indicates that if the ratio of the solely or wholly methyl substituted silicon atoms to the R (including the urethane radical) substituted silicon atoms "exceeds about 300:1 discoloration becomes a problem . . . , apparently due to an insufficient amount of reaction between the siloxane and the fiber." (Col. 5, 11. 47-56.)

It would be desirable to have methods of making elastic fibers or yarns from dry-spun, spandex polymers, having improved spinning performance and fiber or yarn properties which are spun in the absence spinning-process aids such as silicone oil ("polydimethylslioxane" or"PDMS") or magnesium stearate ("MgSt") and elastic fibers or yarns produced from such methods.

SUMMARY OF THE INVENTION

In order to provide the desired methods and elastic fibers or yarns, PDMS was incorporated as a non-volatile component of the spandex polymer chain via a hydroxyl-terminated PDMS used in the capping reaction, or an amine-terminated PDMS in the diluted capped glycol just prior to or during the chain extension reaction, or both.

In one embodiment of the present invention, there is provided a method of making polyurethane or polyurethane urea strands containing siloxane in the polyurethane or polyurethane urea backbone including the steps of: (a) reacting a macroglycol with a diisocyanate to form a prepolymer; (b) reacting the prepolymer with a diamine to form a spinning solution; (c) dry spinning the spinning solution to form polyurethane or polyurethane urea strands, wherein: i. a diol-polydimethylsiloxane is reacted with the macroglycol and the diisocyanate in step (a); and/or ii. a diamine-polydimethylsiloxane is reacted with the prepolymer prior to the reaction of the prepolymer with the diamine in step (b); and/or iii. a diamine-polydimethylsiloxane is reacted at the same time as the prepolymer and diamine in step (b), and wherein the polyurethane or polyurethane urea strands comprise less than or equal to 6% of siloxane by weight based on the weight of the polyurethane or polyurethane urea strands.

In another embodiment of the present invention, there is provided a method of making polyurethane or polyurethane urea strands containing siloxane in the polyurethane or polyurethane urea backbone comprising the steps of: (a) mixing poly(tetramethylene ether) glycol with methylene diphenyl diisocyanate to form a prepolymer; (b) reacting aminopropyl-terminated polydimethylsiloxane with the prepolymer to form a siloxane-reacted prepolymer; (c) reacting the siloxane-reacted prepolymer with ethylenediamine to form a spinning solution; and (d) dry spinning the spinning solution to form polyurethane or polyurethane urea strands, wherein the polyurethane or polyurethane urea strands comprise from about 0.01% to 4% of siloxane by weight based on the weight of the polyurethane or polyurethane urea strands, and wherein the aminopropyl-terminated polydimethylsiloxane has a molecular weight between about 1,460 and about 5,600 grams per mole.

In a further embodiment of the present invention, there is provided a method of making polyurethane or polyurethane urea strands containing siloxane in the polyurethane or polyurethane urea backbone including the steps of: (a) reacting a macroglycol with a diisocyanate to form a prepolymer; (b) reacting the prepolymer with a diamine to form a spinning solution; (c) dry spinning the spinning solution to form polyurethane or polyurethane urea strands, wherein: i. a diol-polydimethylsiloxane is reacted with the macroglycol and the diisocyanate in step (a); ii. a diamine-polydimethylsiloxane is reacted with the prepolymer prior to the reaction of the prepolymer with the diamine in step (b); or iii. a diamine-polydimethylsiloxane is reacted at the same time as the prepolymer and diamine in step (b), and wherein the polyurethane or polyurethane urea strands comprise less than or equal to 6% of siloxane by weight based on the weight of the polyurethane or polyurethane urea strands, and wherein the siloxane is free of any urethane radical.

In yet another embodiment of the present invention, there is provided a method of making polyurethane or polyurethane urea strands containing siloxane in the polyurethane or polyurethane urea backbone comprising the steps of: (a) mixing poly(tetramethylene ether) glycol with methylene diphenyl diisocyanate to form a prepolymer; (b) reacting aminopropyl-terminated polydimethylsiloxane with the prepolymer to form a siloxane-reacted prepolymer; (c) reacting the siloxane-reacted prepolymer with ethylenediamine to form a spinning solution; and (d) dry spinning the spinning solution to form polyurethane or polyurethane urea strands, wherein the polyurethane or polyurethane urea strands comprise from about 0.01% to 4% of siloxane by weight based on the weight of the polyurethane or polyurethane urea strands, and wherein the aminopropyl-terminated polydimethylsiloxane has a molecular weight between about 1,460 and about 5,600 grams per mole, and wherein the siloxane is free of any urethane radical.

In an embodiment of the present invention, there is provided an elastic fiber including two or more polyurethane or polyurethane urea strands including siloxane in the polyurethane or polyurethane urea backbone that are bundled together, wherein the siloxane is present in an amount of greater than or equal to 0.01% and less than or equal to 4.0% by weight based on the weight of the fiber.

In a further embodiment of the present invention, there is provided an elastic fiber including two or more polyurethane or polyurethane urea strands including siloxane in the polyurethane or polyurethane urea backbone that are bundled together, wherein the siloxane is present in an amount of greater than or equal to 0.01% and less than or equal to 4% by weight based on the weight of the fiber and wherein the siloxane is free of any urethane radical.

In yet another embodiment the present invention, there is provided a method of making polyurethane or polyurethane urea strands containing siloxane in the polyurethane or polyurethane urea backbone including the steps of: (a) reacting a macroglycol with a diisocyanate to form a prepolymer; (b) reacting the prepolymer with a diamine to form a spinning solution; (c) dry spinning the spinning solution to form polyurethane or polyurethane urea strands, wherein: i. a mono-functional hydroxyalkly-siloxane, such as mono-functional hydroxyalkly-PDMS, is reacted with the macroglycol and the diisocyanate in step (a); ii. a mono-functional aminoalkyl-siloxane, such as mono-functional aminoalkyl-PDMS, is reacted with the prepolymer prior to the reaction of the prepolymer with the diamine in step (b); or iii. a mono-functional aminoalkyl-siloxane, such as mono-functional aminoalkyl-PDMS, is reacted at the same time as the prepolymer and diamine in step (b), and wherein the polyurethane or polyurethane urea strands comprise less than or equal to 6% of siloxane by weight based on the weight of the polyurethane or polyurethane urea strands.

In yet another embodiment the present invention, there is provided a method of making polyurethane or polyurethane urea strands containing siloxane in the polyurethane or polyurethane urea backbone including the steps of: (a) reacting a macroglycol with a diisocyanate to form a prepolymer; (b) reacting the prepolymer with a diamine to form a spinning solution; (c) dry spinning the spinning solution to form polyurethane or polyurethane urea strands, wherein: i. a mono-functional hydroxyalkly-siloxane, such as mono-functional hydroxyalkly-PDMS, is reacted with the macroglycol and the diisocyanate in step (a); ii. a mono-functional aminoalkyl-siloxane, such as mono-functional aminoalkyl-PDMS, is reacted with the prepolymer prior to the reaction of the prepolymer with the diamine in step (b); or iii. a mono-functional aminoalkyl-siloxane, such as mono-functional aminoalkyl-PDMS, is reacted at the same time as the prepolymer and diamine in step (b), and wherein the polyurethane or polyurethane urea strands comprise less than or equal to 6% of siloxane by weight based on the weight of the polyurethane or polyurethane urea strands, and wherein the siloxane is free of any urethane radical.

BRIEF DESCRIPTION OF THE FIGURES

FIG. 1 shows the impact of increasing the level of reacted-in APTS and HATS on whiteness retention.

DETAILED DESCRIPTION OF THE INVENTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features that may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, fabrics, textiles, and the like, which are within the skill of the art. Such techniques are fully explained in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmospheres. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions

As used herein, the term "strand" or "fiber" refers to filamentous material that can be a monofil or a group of coalesced filaments, which can be used in fabric and yarn as well as textile fabrication. One or more strands or fibers can be used to produce a fabric or yarn. The yarn can be fully drawn or textured according to methods known in the art. "Strand" and "fiber" are used interchangeably herein.

As used herein, "spandex" refers to synthetic polyurethane or polyurethane urea fiber in which the fiber-forming substance is a long chain synthetic elastomer comprised of about 85% or more by weight of a segmented polyurethane, where polyurethane ureas are considered a sub-class of such polyurethanes. Such a synthetic fiber may be wound on a cylindrical core to form a supply package. Spandex compositions may be prepared by a melt-spinning, wet-spinning or a dry-spinning process and can have any of a variety of cross-sections such as a round cross-section or a flat "tape-like" cross section. Alternatively, a polyurethane solution can be cast and dried to form a "tape" configuration.

As used herein, "polyurethane or polyurethane urea backbone" refers to the segmented polyurethane or polyurethane urea that makes up the majority of the polyurethane or polyurethane urea fibers.

As used herein, the term "siloxane" refers to a composition including a silicone-oxygen-silicone linkage, e.g.,

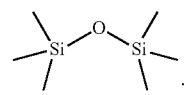

Siloxanes may include polymeric siloxanes and branched siloxanes. A preferred siloxane is PDMS. Preferred siloxanes are those that are free of any urethane radical.

As used herein, the term "urethane radical" refers to a radical which is the ester of carbamic acid, i.e.

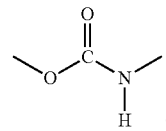

Discussion

Embodiments of the present disclosure provide for an elastic fiber containing siloxane incorporated into the fiber backbone, methods of preparing the fiber, methods of using this fiber, laminates including the fiber, fabrics including the fiber, garments and textiles including the fiber, and the like. Embodiments of the present disclosure improve the spinning performance of the yarn. Embodiments of the present disclosure improve the whiteness retention of the yarn. Embodiments of the present disclosure improve the resistance to power loss due to thermal treatment in a stretched condition.

In one embodiment of the present invention, there is provided a method of making polyurethane or polyurethane urea strands containing siloxane in the polyurethane or polyurethane urea backbone including the steps of: (a) reacting a macroglycol with a diisocyanate to form a prepolymer; (b) reacting the prepolymer with a diamine to form a spinning solution; (c) dry spinning the spinning solution to form polyurethane or polyurethane urea strands, wherein: i. a diol-polydimethylsiloxane is reacted with the macroglycol and the diisocyanate in step (a); and/or ii. a diamine-polydimethylsiloxane is reacted with the prepolymer prior to the reaction of the prepolymer with the diamine in step (b); and/or iii. a diamine-polydimethylsiloxane is reacted at the same time as the prepolymer and diamine in step (b), and wherein the polyurethane or polyurethane urea strands comprise less than or equal to 6% of siloxane by weight based on the weight of the polyurethane or polyurethane urea strands.

In an embodiment, the polyurethane or polyurethane urea strands made by the method of the present invention include about 6% siloxane or less by weight based on the weight of the polyurethane or polyurethane urea strands. In embodiments of the present invention, the polyurethane or polyurethane urea strands made by the method of the present invention include about 0.01% to about 4% siloxane by weight based on the weight of the polyurethane or polyurethane urea strands. In embodiments of the present invention, the polyurethane or polyurethane urea strands made by the method of the present invention include about 0.025% to about 2% siloxane by weight based on the weight of the polyurethane or polyurethane urea strands. In embodiments of the present invention, the polyurethane or polyurethane urea strands made by the method of the present invention include about 0.05%, 0.1%, about 0.2%, about 0.3%, about 0.4%, about 0.5%, about 0.6%, about 0.7%, about 0.8%, about 0.9%, about 1%, about 2%, about 3%, about 4%, or about 5% siloxane by weight based on the weight of the polyurethane or polyurethane urea strands.

The polyurethane polymers used to create polyurethane strands of the present disclosure may generally be formed in a "one-step" or "two-step" polymer process. In a one-step polymerization process a mixture of the polymeric glycol (i.e. a macromolecular glycol) is reacted with, for example, a diisocyante and diol chain extenders to form a polyurethane polymer. In a two-step polymer process a mixture of the NCO-terminated prepolymer (i.e. a capped glycol) is reacted with, for example, diol chain extenders. Polyurethanes may be prepared without solvents and melt spun. In addition, polyurethanes may be prepared with solvent such as dimethylacetamide, dimethylformamide, or N-methylpyrrolidone and either dry-spun (in nitrogen, air or any other suitable aspiration gas) or wet-spun.

The polyurethane urea polymers used to create the polyurethane urea strands of the present disclosure may generally be prepared by capping a macroglycol (i.e., macromolecular glycol) with, for example, a diisocyanate to form a prepolymer. The prepolymer (i.e., a capped glycol) may then be dissolved or diluted in a suitable solvent (e.g., dimethylacetamide (DMAc), N-methylpyrrolidone, dimethylformamide, and the like). The capped glycol may then be chain-extended the with chain extenders such as diamines to form polyurethane ureas to form a spinning solution. The polyurethane urea spin solution may be either dry-spun (in nitrogen, air or any other suitable aspiration gas) or wet-spun.

Polyurethane urea compositions useful for preparing fiber or long chain synthetic polymers include at least 85% by weight of a segmented polyurethane. Typically, these include a polymeric glycol which is reacted with a diisocyanate to form an NCO-terminated prepolymer (a "capped glycol"), which is then dissolved in a suitable solvent, such as dimethylacetamide, dimethylformamide, or N-methylpyrrolidone, and secondarily reacted with a difunctional chain extender.

Polyurethane ureas, a sub-class of polyurethanes, are formed when the chain extenders are diamines. In the preparation of a polyurethane urea polymer which can be spun into spandex, the glycols are extended by sequential reaction of the hydroxy end groups with diisocyanates and one or more diamines. In each case, the glycols must undergo chain extension to provide a polymer with the necessary properties, including viscosity. If desired, dibutyltin dilaurate, stannous octoate, mineral acids, tertiary amines such as triethylamine, N,N'-dimethylpiperazine, and the like, and other known catalysts can be used to assist in the capping step.

In an embodiment of the present invention, the siloxane is introduced into the backbone of the polyurethane strands by 1) reacting a diol-siloxane with the macroglycol and disocyante with a diol chain extender during the formation of the final polymer (in a one-step process) or 2) reacting a diol-siloxane with the macroglycol and disocyante during the formation of the prepolymer (without a diol chain extender) and reacting the prepolymer with a diol chain extender to form the spinning solution (in a two-step process), or 3) reacting a the macroglycol and disocyante during the formation of the prepolymer (without a diol chain extender) and reacting the prepolymer with a diol-siloxane and a diol chain extender to form the spinning solution (in a two-step process), or 4) reacting a diol-siloxane with a the macroglycol and disocyante during the formation of the prepolymer (without a diol chain extender) and reacting the prepolymer with a diol-siloxane and a diol chain extender to form the spinning solution (in a two-step process).

In an embodiment of the present invention, the siloxane is introduced into the backbone of the polyurethane urea strands by 1) reacting a diol-siloxane with the macroglycol and diisocyante during the formation of the prepolymer and reacting the prepolymer with the diamine chain extender to faun the spinning solution, or 2) reacting a diol-siloxane with the macroglycol and diisocyante during the formation of the prepolymer and reacting the prepolymer with a diamine-siloxane prior to the reaction of the prepolymer with the diamine chain extender to form the spinning solution, or 3) reacting a diol-siloxane with the macroglycol and diisocyante during the formation of the prepolymer and reacting the prepolymer with a diamine-siloxane during the reaction of the prepolymer with the diamine chain extender to form the spinning solution, or 4) reacting a diol-siloxane with the macroglycol and diisocyante during the formation of the prepolymer and reacting the prepolymer with a diamine-siloxane prior to and during the reaction of the prepolymer with the diamine chain extender to form the spinning solution, or 5) reacting the macro glycol and diisocyante during the formation of the prepolymer and reacting the prepolymer with a diamine-siloxane prior to the diamine chain extender to form the spinning solution, or 6) reacting the macro glycol and diisocyante during the formation of the prepolymer and reacting the prepolymer with a diamine-siloxane during the reaction of the prepolymer with the diamine chain extender to form the spinning solution, or 7) reacting the macroglycol and diisocyante during the formation of the prepolymer and reacting the prepolymer with a diamine-siloxane prior to and during the reaction of the prepolymer with a the diamine chain extender to form the spinning solution.

In an embodiment of the present invention, the diol-siloxane (for example a diol-PDMS) is added during the formation of the prepolymer prior to dilution of the prepolymer with a suitable solvent (such as dimethylacetamide, dimethylformamide, or N-methylpyrrolidone). In an embodiment of the present invention, the diamine-siloxane (for example a diamine-PDMS) is added during or immediately after the dilution of the prepolymer with a suitable solvent (such as dimethylacetamide, dimethylformamide, or N-methylpyrrolidone). In an embodiment of the present invention, the diamine-siloxane (for example a diamine-PDMS) is added either prior-to, during, or both prior-to-and-during the reaction of the prepolymer with the diamine chain extender. In an embodiment of the present invention, the diol-siloxane (for example a diol-PDMS) is added during the formation of the prepolymer prior to dilution of the prepolymer with a suitable solvent (such as dimethylacetamide, dimethylformamide, or N-methylpyrrolidone) and the diamine-siloxane (for example a diamine-PDMS) is added during or immediately after the dilution of the prepolymer with a suitable solvent (such as dimethylacetamide, dimethylformamide, or N-methylpyrrolidone). In an embodiment of the present invention, the diol-siloxane (for example a diol-PDMS) is added during the formation of the prepolymer prior to dilution of the prepolymer with a suitable solvent (such as dimethylacetamide, dimethylformamide, or N-methylpyrrolidone) and the diamine-siloxane (for example a diamine-PDMS) is added during or immediately after the dilution of the prepolymer with a suitable solvent (such as dimethylacetamide, dimethylformamide, or N-methylpyrrolidone) and diamine-siloxane (for example a diamine-PDMS) is added during the reaction of the prepolymer with the diamine chain extender. In an embodiment of the present invention, the diol-siloxane (for example a diol-PDMS) is added during the formation of the prepolymer prior to dilution of the prepolymer with a suitable solvent (such as dimethylacetamide, dimethylformamide, or N-methylpyrrolidone) and diamine-siloxane (for example a diamine-PDMS) is added either prior-to, during, or both prior-to-and-during the reaction of the prepolymer with the diamine chain extender.

In an embodiment of the present invention, the diol-siloxane is diol-PDMS. In an embodiment of the present invention, the diol-PDMS is a hydroxyalkyl-terminated-PDMS.

In an embodiment of the present invention, the diamine-siloxane is diamine-PDMS. In an embodiment of the present invention, the diamine-PDMS is an aminoalkyl-terminated-PDMS. In an embodiment of the present invention, the aminoalkyl-terminated-PDMS is an aminopropyl-terminated-PDMS.

In an embodiment of the present invention, the diol-PDMS or diamine-PDMS has a molecular weight of about 15,000 grams per mole or less. In an embodiment of the present invention, the diol-PDMS or diamine-PDMS has a molecular weight of between about 500 and about 15,000 grams per mole. In an embodiment of the present invention, the diol-PDMS or diamine-PDMS has a molecular weight of between about 1,000 and about 10,000 grams per mole. In an embodiment of the present invention, the diol-PDMS or diamine-PDMS has a molecular weight of between about 1,460 and about 5,600 grams per mole.

In other embodiments of the present invention, the siloxane is introduced into the backbone of the polyurethane or polyurethane urea strands by 1) reacting a mono-functional hydroxyalkly-siloxane, such as mono-functional hydroxyalkly-PDMS, with the macroglycol and disocyante during the formation of either the final polymer (with chain extender diol in a one-step process) or prepolymer (without chain extender diol in a two-step process) and/or 2) reacting the prepolymer with a mono-functional aminoalkyl-siloxane, such as mono-functional aminoalkyl-PDMS, prior to and/or during the reaction of the prepolymer with the diamine or diol to form the spinning solution.

In another embodiment of the present invention, there is provided a method of making polyurethane or polyurethane urea strands containing siloxane in the polyurethane or polyurethane urea backbone including the steps of: (a) reacting a macroglycol with a diisocyanate to form a prepolymer; (b) reacting the prepolymer with a diamine to form a spinning solution; (c) dry spinning the spinning solution to form polyurethane or polyurealkly urea strands, wherein: i. a mono-functional hydroxyalkly-siloxane, such as mono-functional hydroxyalkly-PDMS, is reacted with the macroglycol and the diisocyanate in step (a); and/or ii. a mono-functional aminoalkyl-siloxane, such as mono-functional aminoalkyl-PDMS, is reacted with the prepolymer prior to the reaction of the prepolymer with the diamine in step (b); and/or iii. a mono-functional aminoalkyl-siloxane, such as mono-functional aminoalkyl-PDMS, is reacted at the same time as the prepolymer and diamine in step (b), and wherein the polyurethane or polyurethane urea strands comprise less than or equal to 6% of siloxane by weight based on the weight of the polyurethane or polyurethane urea strands.

The polyurethane with siloxane in the polymer backbone may be made without solvent may be melt spun and/or may be used as an additive in a melt spun mixture. The polyurethane or polyurethane urea with siloxane in the polymer backbone may be made in the presence of solvent (such as dimethylacetamide, dimethylformamide, or N-methylpyrrolidone) which may comprise the spinning solution and/or be used as an additive in a spinning solution mixture. The polyurethane or polyurethane urea strands are then formed by spinning the melted polymer or the spinning solution. The spinning solution may be a wet- or dry-spinning process. In dry spinning the spinning solution is pumped through a spinneret (die) with numerous holes. As the strands exit the spinneret, gas such as air or nitrogen is used to remove the solvent so that the fibers solidify and may be collected. In wet spinning strands are extruded directly into a liquid bath. Being extruded into a liquid provides a greater drag force on the filament than strands extruded directly into air, thus the extrusion speed is less than with dry spinning. The spinning solution is extruded into a liquid that will draw out the solvent, leaving behind only the polymer. Wet spinning is based on precipitation of the polymer when the polymer is drawn through a spinneret into a non-solvent. The spinning may be a multiple component spinning (as referenced in US2012/0034834 A1, Steven W. Smith, et al). Multiple component, dry-spun fibers include a cross-section, wherein at least a first region of said cross-section includes an elastomeric polyurethane, or a polyurethaneurea, or a mixture thereof; and includes a least one additional region including an elastomeric polyurethane, or a polyurethaneurea, or a mixture thereof and at least one non-volatile, polymerized-in PDMS component. The stands produced by wet, dry, or multiple component spinning process may have one or more filaments, such as a single monofilament, duo (two filament), three filament, etc. Where a fiber has more than one filament, each filament can include a multiple component cross-section with two or more regions.

In an embodiment, suitable macroglycols include, but are not limited to, polyether glycols, polycarbonate glycols, and polyester glycols of number average molecular weight of about 600 to 3,500. Mixtures of two or more polymeric glycol or copolymers can be included.

In an embodiment, examples of polyether glycols that can be used include, but are not limited to, those glycols with two hydroxyl groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, such as a diol or diol mixtures, with less than 12 carbon atoms in each molecule, such as ethylene glycol, 1,3-propanediol, 1,4-butanediol, 1,5-pentanediol 1,6-hexanediol, 2,2-dimethyl-1,3 propanediol, 3-methyl-1,5-pentanediol, 1,7-heptanediol, 1,8-octanediol, 1,9-nonanediol, 1,10-decanediol and 1,12-dodecanediol. A poly(tetramethylene ether) glycol of molecular weight of about 1,700 to about 2,100, such as Terathane® 1800 (INVISTA of Wichita, Kans.) with a functionality of 2, is an example of a specific suitable glycol. Co-polymers can include poly(tetramethylene-co-ethyleneether) glycol.

In an embodiment, examples of polyester polyols that can be used include, but are not limited to, those ester glycols with two hydroxyl groups, produced by condensation polymerization of aliphatic polycarboxylic acids and polyols, or their mixtures, of low molecular weights with no more than 12 carbon atoms in each molecule. Examples of suitable polycarboxylic acids include, but are not limited to, malonic acid, succinic acid, glutaric acid, adipic acid, pimelic acid, suberic acid, azelaic acid, sebacic acid, undecanedicarboxylic acid, and dodecanedicarboxylic acid. Examples of suitable polyols for preparing the polyester polyols include, but are not limited to, ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear bifunctional polyester polyol with a melting temperature of about 5° C. to 50° C. is an example of a specific polyester polyol.

In an embodiment, examples of polycarbonate polyols that can be used include, but are not limited to, those carbonate glycols with two or more hydroxy groups, produced by condensation polymerization of phosgene, chloroformic acid ester, dialkyl carbonate or diallyl carbonate and aliphatic polyols, or their mixtures, of low molecular weights with no more than 12 carbon atoms in each molecule. Examples of suitable polyols for preparing the polycarbonate polyols include, but are not limited to, diethylene glycol, 1,3-propanediol, 1,4-butanediol, 1,5-pentanediol, 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polycarbonate polyol with a melting temperature of about 5° C. to about ° C. is an example of a specific polycarbonate polyol.

In an embodiment of the present invention, the preferred marcoglycol is selected from the group consisting of poly(tetramethylene ether) glycol, poly(tetramethylene adipate) glycol, poly(oxytetramethylene) glycol, poly(ε-caprolactone) glycol, poly(hexamethylenecarbonate) glycol, poly(1, 2-oxypropylene) glycol, poly(tetramethylene-co-ethyleneether) glycol, poly(tetramethylene-co-2-methyltetramethyleneether) glycol, poly(ethyleneether) glycol, poly(propyleneether) glycol, polycarbonate glycol, polyester glycol, and combinations thereof.

In an embodiment of the present invention, the marcoglycol is poly(tetramethylene ether) glycol. In an embodiment of the present invention, the marcoglycol is poly(tetramethylene ether) glycol having a molecular weigh of between about 600 and about 3,500 grams per mole, or between about 1,600 and about 2,300 grams per mole, or between about 1,800 and about 2,000 grams per mole.

In an embodiment, the diisocyanate can include a single diisocyanate or a mixture of different diisocyanates including an isomer mixture of diphenylmethane diisocyanate (MDI) containing 4,4'-methylene bis(phenyl isocyanate) and 2,4'-methylene bis(phenyl isocyanate). Any suitable aromatic or aliphatic diisocyanate can be included. Examples of diisocyanates that can be used include, but are not limited to methylene diphenyl diisocyanate, toluene diisocyanate, hexamethylene diisocyanate, isophorone diisocyanate, cyclohexylene diisocyanate, phenylene diisocyanate, trimethyl xylylene diisocyanate, xylylene diisocyanate, methylene dicyclohexyl diisocyanate, 4,4'-methylene bis(phenyl isocyanate), 2,4'-methylene bis(phenyl isocyanate), 4,4'-methylenebis(cyclohexyl isocyanate), 1,3-diisocyanato-4-methyl-benzene, 2,2'-toluenediisocyanate, 2,4'-toluenediisocyanate, and mixtures thereof.

In an embodiment of the present invention, the diisocyanate is methylene diphenyl diisocyanate.

In an embodiment, a chain extender may be either water or a diamine chain extender for a polyurethane urea. Combinations of different chain extenders may be included depending on the desired properties of the polyurethane urea and the resulting fiber. Examples of suitable diamine chain extenders include, but are not limited to: ethylenediamine, methylpentamethylenediamine, phenylenediamine butanediamine, hexamethyldiamine, propylenediamine, xylene diamine, cyclohexane diamine, hydrazine; 1,2-ethylenediamine; 1,4-butanediamine; 1,2-butanediamine; 1,3-butanediamine; 1,3-diamino-2,2-dimethylbutane; 1,6-hexamethylenediamine; 1,12-dodecanediamine; 1,2-propanediamine; 1,3-propanediamine; 2-methyl-1,5-pentanediamine; 1-amino-3,3,5-trimethyl-5-aminomethylcyclohexane; 2,4-diamino-1-methylcyclohexane; N-methylamino-bis(3-propylamine); 1,2-cyclohexanediamine; 1,4-cyclohexanediamine; 4,4'-methylene-bis(cyclohexylamine); isophorone diamine; 2,2-dimethyl-1,3-propanediamine; meta-tetramethylxylenediamine; 1,3-diamino-4-methylcyclohexane; 1,3-cyclohexane-diamine; 1,1-methylene-bis(4,4'-diaminohexane); 3-aminomethyl-3,5,5-trimethylcyclohexane; 1,3-pentanediamine (1,3-diaminopentane); m-xylylene diamine; and Jeffamine® (Huntsman).

In an embodiment of the present invention, the diamine is ethylenediamine or a mixture of ethylenediamine and methylpentamethylenediamine.

When a polyurethane is desired, the chain extender is a diol. Examples of such diols that may be used include, but are not limited to, ethylene glycol, 1,3-propanediol, 1,2-propylene glycol, 3-methyl-1,5-pentanediol, 2,2-dimethyl-1,3-propanediol, 2,2,4-trimethyl-1,5-pentanediol, 2-methyl-2-ethyl-1,3-propanediol, 1,4-bis(hydroxyethoxy)benzene, and 1,4-butanediol, hexanediol and mixtures thereof.

In an embodiment, a monofunctional alcohol or a primary/secondary monofunctional amine may optionally be included to control the molecular weight of the polymer. Blends of one or more monofunctional alcohols with one or more monofunctional amines may also be included. Examples of monofunctional alcohols useful with the present disclosure include, but are not limited to, at least one member selected from the group consisting of aliphatic and cycloaliphatic primary and secondary alcohols with 1 to 18 carbons, phenol, substituted phenols, ethoxylated alkyl phenols and ethoxylated fatty alcohols with molecular weight less than about 750, including molecular weight less than 500, hydroxyamines, hydroxymethyl and hydroxyethyl substituted tertiary amines, hydroxymethyl and hydroxyethyl substituted heterocyclic compounds, and combinations thereof, including furfuryl alcohol, tetrahydrofurfuryl alcohol, N-(2-hydroxyethyl)succinimide, 4-(2-hydroxyethyl)morpholine, methanol, ethanol, butanol, neopentyl alcohol, hexanol, cyclohexanol, cyclohexanemethanol, benzyl alcohol, octanol, octadecanol, N,N-diethylhydroxylamine, 2-(diethylamino)ethanol, 2-dimethylaminoethanol, and 4-piperidineethanol, and combinations thereof. Examples of suitable mono-functional dialkylamine blocking agents include, but not limited to: N,N-diethylamine, N-ethyl-N-propylamine, N,N-diisopropylamine, N-tert-butyl-N-methylamine, N-tert-butyl-N-benzylamine, N,N-dicyclohexylamine, N-ethyl-N-isopropylamine, N-tert-butyl-N-isopropylamine, N-isopropyl-N-cyclohexylamine, N-ethyl-N-cyclohexylamine, N,N-diethanolamine, and 2,2,6,6-tetramethylpiperidine.

In another embodiment of the present invention, there is provided a method of making polyurethane or polyurethane urea strands containing siloxane in the polyurethane or polyurethane urea backbone comprising the steps of: (a) mixing poly(tetramethylene ether) glycol with methylene diphenyl diisocyanate to form a prepolymer; (b) reacting aminopropyl-terminated polydimethylsiloxane with the prepolymer to form a siloxane-reacted prepolymer; (c) reacting the siloxane-reacted prepolymer with ethylenediamine to form a spinning solution; and (d) dry spinning the spinning solution to form polyurethane or polyurethane urea strands, wherein the polyurethane or polyurethane urea strands comprise from about 0.01% to 4% of siloxane by weight based on the weight of the polyurethane or polyurethane urea strands, and wherein the aminopropyl-terminated polydimethylsiloxane has a molecular weight between about 1,460 and about 5,600 grams per mole.

In a further embodiment of the present invention, there is provided a method of making polyurethane or polyurethane urea strands containing siloxane in the polyurethane or polyurethane urea backbone including the steps of: (a) reacting a macroglycol with a diisocyanate to form a prepolymer; (b) reacting the prepolymer with a diamine to form a spinning solution; (c) dry spinning the spinning solution to form polyurethane or polyurethane urea strands, wherein: i. a diol-polydimethylsiloxane is reacted with the macroglycol and the diisocyanate in step (a); and/or ii. a diamine-polydimethylsiloxane is reacted with the prepolymer prior to the reaction of the prepolymer with the diamine in step (b); and/or iii. a diamine-polydimethylsiloxane is reacted at the same time as the prepolymer and diamine in step (b), and wherein the polyurethane or polyurethane urea strands comprise less than or equal to 6% of siloxane by weight based on the weight of the polyurethane or polyurethane urea strands, and wherein the siloxane is free of any urethane radical.

In yet another embodiment of the present invention, there is provided a method of making polyurethane or polyurethane urea strands containing siloxane in the polyurethane or polyurethane urea backbone comprising the steps of: (a) mixing poly(tetramethylene ether) glycol with methylene diphenyl diisocyanate to form a prepolymer; (b) reacting aminopropyl-terminated polydimethylsiloxane with the prepolymer to form a siloxane-reacted prepolymer; (c) reacting the siloxane-reacted prepolymer with ethylenediamine to form a spinning solution; and (d) dry spinning the spinning solution to form polyurethane or polyurethane urea strands, wherein the polyurethane or polyurethane urea strands comprise from about 0.01% to 4% of siloxane by weight based on the weight of the polyurethane or polyurethane urea strands, and wherein the aminopropyl-terminated polydimethylsiloxane has a molecular weight between about 1,460 and about 5,600 grams per mole, and wherein the siloxane is free of any urethane radical.

In an embodiment of the present invention, two or more polyurethane or polyurethane urea strands including siloxane in the polyurethane or polyurethane urea backbone are coalesced to form siloxane-containing polyurethane or polyurethane urea fibers.

In an embodiment of the present invention, there is provided an elastic fiber including two or more polyurethane or polyurethane urea strands including siloxane in the polyurethane or polyurethane urea backbone that are bundled together, wherein the siloxane is present in an amount of greater than 0.01% and less than or equal to 6% by weight based on the weight of the fiber.

In a further embodiment of the present invention, there is provided an elastic fiber including two or more polyurethane or polyurethane urea strands including siloxane in the polyurethane or polyurethane urea backbone that are bundled together, wherein the siloxane is present in an amount of greater than 0.01% and less than or equal to 6% by weight based on the weight of the fiber and wherein the siloxane is free of any urethane radical.

In an embodiment of the present invention, the siloxane in the polyurethane or polyurethane urea backbone of the two or more polyurethane or polyurethane urea strands of the elastic fiber is in the form of a plurality of polysiloxane domains and the polysiloxane domains each have a molecular weight of about 15,000 grams per mole or less. In an embodiment of the present invention, the siloxane in the polyurethane or polyurethane urea backbone of the two or more polyurethane or polyurethane urea strands of the elastic fiber is in the form of a plurality of polysiloxane domains and the polysiloxane domains each have a molecular weight of about 500 and 15,000 grams per mole. In an embodiment of the present invention, the siloxane in the polyurethane or polyurethane urea backbone of the two or more polyurethane or polyurethane urea strands of the elastic fiber is in the form of a plurality of polysiloxane domains and the polysiloxane domains each have a molecular weight of about 1,000 and about 10,000 grams per mole. In an embodiment of the present invention, the siloxane in the polyurethane or polyurethane urea backbone of the two or more polyurethane or polyurethane urea strands of the elastic fiber is in the form of a plurality of polysiloxane domains and the polysiloxane domains each have a molecular weight of about 1,460 and about 5,600 grams per mole.

In an embodiment, the polyurethane or polyurethane urea strands of the present disclosure may contain an additional, conventional additive that are added for specific purposes, such as antioxidants, thermal stabilizers, antitack agent (such as magnesium stearate, calcium stearate or ethylene bis(stearamide)), UV stabilizers, pigments and delusterants (for example titanium dioxide), dyes and dye enhancers, additives to enhance resistance to chlorine degradation (for example zinc oxide; magnesium oxide and mixtures of huntite and hydromagnesite), and the like, so long as such additives do not produce antagonistic effects with the polyurethane or polyurethane urea strands of this disclosure.

Embodiments of the present disclosure include articles of manufacture comprising the elastic fiber of the present disclosure. These articles of manufacture include, but are not limited to, a fabric and laminate structures.

The laminate structure may be adhered by an adhesive, ultrasonic bonding, thermal bonding or combinations thereof. The laminate structure may comprise a disposable hygiene article such as diapers, training pants, adult incontinence articles, or feminine hygiene articles.

Examples

Having described the embodiments of the present disclosure, in general, the following Examples describe some additional embodiments of the present disclosure. While embodiments of present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

1. Production of Samples for Evaluation

An initial scouting test was performed to examine the impact of polymerized-in PDMS on spinning performance and yarn properties. The spandex polymers from the initial scouting test, as reported in Table 1, were prepared in a lab-scale, batch process and spun on a 1-threadline dry-spinning process. The hydroxyalkyl-terminated PDMS ("HATS") was added to the capping reaction vessel. The amine-terminated PDMS ("APTS") was added to the dilute capped glycol prior to the chain extension reaction. The glycol used for these experiments was a nominal 1800 molecular weight PTMEG. The extender consisted of EDA. The coextender consisted of Dytek® A. The terminator consisted of DEA. The brancher consisted of DETA. Sample A2 contained 0.5% spun-in PDMS, no spun-in MgSt and no reacted-in APTS. Sample B2 contained no spun-in PDMS, no spun-in MgSt and no reacted-in APTS. The APTS used in test parts C3, C4 & C5 (Table 2) was NH40D with a molecular weight of about 2,750 grams per mole.

All polymer samples reported in Table 2 were spun as 40-denier, four-filament yarns, at 2,850 feet per minute, under typical spandex dry-spinning conditions. Residual DMAc levels in yarn samples were less than 1%. A silicone containing finish applied to the yarn surface was in the range 3 to 4%.

TABLE 2

Tech Lab CP Polymer Recipes

| Test Part | NCO (%) | Glycol (%) | MDI (%) | Extender (%) | Coextender (%) | Terminator (%) | Brancher (%) | APTS (%) | PDMS (%) |
|---|---|---|---|---|---|---|---|---|---|
| A2 | 2.60 | 79.2142 | 18.5860 | 1.5510 | 0.3332 | 0.2926 | 0.0230 | 0.0000 | 0.50 |
| B2 | 2.60 | 79.2142 | 18.5860 | 1.5510 | 0.3332 | 0.2926 | 0.0230 | 0.0000 | 0.00 |
| C3 | 2.60 | 78.8978 | 18.5118 | 1.5368 | 0.3302 | 0.2926 | 0.0230 | 0.4000 | 0.00 |
| C4 | 2.60 | 79.0304 | 18.5429 | 1.5427 | 0.3314 | 0.2926 | 0.0230 | 0.2400 | 0.00 |
| C5 | 2.60 | 79.1190 | 18.5637 | 1.5467 | 0.3323 | 0.2926 | 0.0230 | 0.1200 | 0.00 |

The coextender consisted of Dytek® A. The terminator consisted of DEA. The brancher consisted of DETA.

The test part A1 was made with 0.5% spun-in PDMS. The test part B1 was made with no spun-in PDMS. The test parts C1 & C2 (Table 1) were prepared with APTS with a molecular weight of about 2,850 grams per mole. The test part D1 (Table 1) was prepared with APTS with a molecular weight of about 27,000 grams per mole. The test part E1 (Table 1) was prepared with HATS with a molecular weight of about 5,600 grams per mole.

All polymer samples reported in Table 1 were spun as 40-denier, three-filament yarns, at 2,500 feet per minute, under typical spandex dry-spinning conditions on a 1-threadline spinning machine. Residual DMAc levels in yarn samples were less than 1%. A silicone containing finish applied to the yarn surface was in the range 3 to 4%.

Upon completion of the Tech-Lab-scale, continuous polymerizer test, a third test series was performed to investigate the impact of different vendors' APTS types made at nominal about 0.3% and about 0.1% level. The polymer compositions from the vendor-APTS-type test series are reported in Table 3 below. All the polymers reported in Table 3 were prepared in a lab-scale, batch process. The APTS was added to the dilute capped glycol prior to the chain extension reaction. The glycol used for these experiments was a nominal 1,800 molecular weight PTMEG. The extender consisted of EDA. The coextender consisted of Dytek® A.

TABLE 1

Lab Batch Polymer Recipes

| Test Part | NCO (%) | Glycol (%) | HATS (%) | MDI (%) | Extender (%) | Coextender (%) | Terminater (%) | Brancher (%) | APTS (%) | PDMS (%) |
|---|---|---|---|---|---|---|---|---|---|---|
| A1 | 2.60 | 79.1326 | 0.0000 | 18.7145 | 1.5438 | 0.3316 | 0.2528 | 0.0247 | 0.0000 | 0.50 |
| B1 | 2.60 | 79.1326 | 0.0000 | 18.7145 | 1.5438 | 0.3316 | 0.2528 | 0.0247 | 0.0000 | 0.00 |
| C1 | 2.60 | 77.9658 | 0.0000 | 18.2931 | 1.4932 | 0.3207 | 0.2926 | 0.0250 | 1.6096 | 0.00 |
| C2 | 2.60 | 78.5847 | 0.0000 | 18.4383 | 1.5211 | 0.3268 | 0.2926 | 0.0250 | 0.8115 | 0.00 |
| D1 | 2.60 | 78.5388 | 0.0000 | 18.5606 | 1.5299 | 0.3287 | 0.2528 | 0.0247 | 0.7645 | 0.00 |
| E1 | 2.60 | 78.4172 | 0.7921 | 18.6383 | 1.5435 | 0.3315 | 0.2527 | 0.0247 | 0.0000 | 0.00 |

Following the initial scouting test a scale-up test was performed to further investigate the impact of polymerized-in PDMS, on flicking in the coalescence jets and DMAc condensate. The spandex polymers from the scale-up test, as reported in Table 2, were prepared in the Tech Lab Continuous Polymerizer ("TLCP") and spun in a 24-threadline dry-spinning process. The APTS was added to the dilute capped glycol prior to the chain extension reaction. The glycol used for these experiments was a nominal 1,800

The terminator consisted of DEA. The brancher consisted of DETA.

All the polymer samples reported in Table 3 were spun as 40-denier, 3-filament yarns, at 2,500 feet per minute, under typical spandex dry-spinning conditions on a 1-threadline spinning machine. Residual DMAc level in yarn samples were less than 1%. A silicone containing finish applied to the yarn surface was in the range 3 to 5%.

TABLE 3

Vendor APTS Types Lab Batch Polymer Recipes

| Test Part | APTS Type | APTS MW | NCO (%) | Glycol (%) | MDI (%) | EDA (%) | MPMD (%) | DEA (%) | DETA (%) | APTS (%) |
|---|---|---|---|---|---|---|---|---|---|---|
| V0 |  |  | 2.60 | 79.1057 | 18.6945 | 1.5510 | 0.3332 | 0.2926 | 0.0230 | 0.0000 |
| V1 | C6252 | ~2540 | 2.60 | 78.8727 | 18.6395 | 1.5405 | 0.3310 | 0.2926 | 0.0230 | 0.3007 |
| V2 | C6252 | ~2540 | 2.60 | 79.0302 | 18.6767 | 1.5475 | 0.3325 | 0.2926 | 0.0230 | 0.0975 |
| V3 | C5379 | ~1460 | 2.60 | 78.8574 | 18.6359 | 1.5341 | 0.3296 | 0.2926 | 0.0230 | 0.3274 |
| V4 | C5379 | ~1460 | 2.60 | 79.0226 | 18.6749 | 1.5453 | 0.3320 | 0.2926 | 0.0230 | 0.1096 |
| V5 | NH40D | ~2750 | 2.60 | 78.8816 | 18.6416 | 1.5407 | 0.3310 | 0.2926 | 0.0230 | 0.2895 |
| V6 | NH40D | ~2750 | 2.60 | 79.0302 | 18.6767 | 1.5475 | 0.3325 | 0.2926 | 0.0230 | 0.0975 |
| V7 | Aldrich | ~2850 | 2.60 | 78.9024 | 18.6465 | 1.5411 | 0.3311 | 0.2926 | 0.0230 | 0.2633 |
| V8 | Aldrich | ~2850 | 2.60 | 79.0372 | 18.6784 | 1.5477 | 0.3325 | 0.2926 | 0.0230 | 0.0886 |
| V9 | DMSA15 | ~3100 | 2.60 | 78.8726 | 18.6394 | 1.5409 | 0.3311 | 0.2926 | 0.0230 | 0.3004 |
| V10 | DMSA15 | ~3100 | 2.60 | 79.0278 | 18.6761 | 1.5477 | 0.3325 | 0.2926 | 0.0230 | 0.1003 |

Upon completion of the vendor-APTS-type series, a series of dry-spun, spandex-polymer-composition tests were performed to investigate the impact of varying % NCO, chain extender/coextender type (EDA, MPMD, PDA) and extender/coextender mole ratio, terminator type (DEA, CHA) and level, and APTS level. The polymer compositions are reported in Table 4 below. All of the polymers reported in Table 4 were prepared in a lab-scale, batch process. The APTS was added to the dilute capped glycol prior to the chain extension reaction. The glycol used for these experiments was a nominal 1,800 molecular weight PTMEG. The brancher consisted of DETA. The APTS used in this series of experiments was the Aldrich APTS (with a molecular weight of about 2,850 grams per mole).

All the polymer samples reported in Table 4 were spun as 40-denier, 3-filament yarns, at 2,500 feet per minute, under typical spandex dry-spinning conditions on a 1-threadline spinning machine. Residual DMAc level in yarn samples was less than 1%. A silicone containing finish applied to the yarn surface was in the range 2.5 to 5%.

TABLE 4

Varying Spandex Polymer Composition Lab Batch Polymer Recipes

| Test Part | NCO (%) | Glycol (%) | MDI (%) | EDA (%) | MPMD (%) | PDA (%) | DEA (%) | CHA (%) | DETA (%) | APTS (%) |
|---|---|---|---|---|---|---|---|---|---|---|
| AV0 | 2.22 | 80.4875 | 17.7341 | 1.4535 | 0.0000 | 0.0000 | 0.2999 | 0.0000 | 0.0250 | 0.0000 |
| AV1 | 2.22 | 80.4085 | 17.7167 | 1.4498 | 0.0000 | 0.0000 | 0.2999 | 0.0000 | 0.0250 | 0.1001 |
| AV3 | 2.22 | 80.2506 | 17.6819 | 1.4426 | 0.0000 | 0.0000 | 0.2999 | 0.0000 | 0.0250 | 0.3000 |
| BV0 | 2.30 | 80.2359 | 17.9291 | 1.5027 | 0.0000 | 0.0000 | 0.3073 | 0.0000 | 0.0250 | 0.0000 |
| BV1 | 2.30 | 80.1570 | 17.9115 | 1.4990 | 0.0000 | 0.0000 | 0.3073 | 0.0000 | 0.0250 | 0.1002 |
| BV3 | 2.30 | 79.9993 | 17.8762 | 1.4917 | 0.0000 | 0.0000 | 0.3073 | 0.0000 | 0.0250 | 0.3005 |
| CV0 | 2.40 | 79.9176 | 18.1716 | 1.5566 | 0.0000 | 0.0000 | 0.3292 | 0.0000 | 0.0250 | 0.0000 |
| CV1 | 2.40 | 79.8423 | 18.1545 | 1.5530 | 0.0000 | 0.0000 | 0.3292 | 0.0000 | 0.0250 | 0.0960 |
| CV3 | 2.40 | 79.6920 | 18.1203 | 1.5458 | 0.0000 | 0.0000 | 0.3292 | 0.0000 | 0.0250 | 0.2877 |
| DV0 | 2.40 | 79.8044 | 18.1459 | 1.4259 | 0.3063 | 0.0000 | 0.2925 | 0.0000 | 0.0250 | 0.0000 |
| DV1 | 2.40 | 79.7263 | 18.1281 | 1.4225 | 0.3056 | 0.0000 | 0.2925 | 0.0000 | 0.0250 | 0.1000 |
| DV3 | 2.40 | 79.5706 | 18.0927 | 1.4158 | 0.3042 | 0.0000 | 0.2925 | 0.0000 | 0.0250 | 0.2992 |
| EV0 | 2.60 | 79.1057 | 18.6945 | 1.5510 | 0.3332 | 0.0000 | 0.2926 | 0.0000 | 0.0230 | 0.0000 |
| EV1 | 2.60 | 79.0372 | 18.6784 | 1.5477 | 0.3325 | 0.0000 | 0.2926 | 0.0000 | 0.0230 | 0.0886 |
| EV3 | 2.60 | 78.9024 | 18.6465 | 1.5411 | 0.3311 | 0.0000 | 0.2926 | 0.0000 | 0.0230 | 0.2633 |
| FV0 | 2.65 | 78.8830 | 18.7189 | 1.4092 | 0.6812 | 0.0000 | 0.2927 | 0.0000 | 0.0150 | 0.0000 |
| FV1 | 2.65 | 78.8059 | 18.7006 | 1.4061 | 0.6797 | 0.0000 | 0.2927 | 0.0000 | 0.0150 | 0.1000 |
| FV3 | 2.65 | 78.6518 | 18.6641 | 1.3999 | 0.6767 | 0.0000 | 0.2927 | 0.0000 | 0.0150 | 0.2998 |
| GV0 | 2.70 | 78.9376 | 18.8900 | 1.5233 | 0.0000 | 0.3316 | 0.2925 | 0.0000 | 0.0250 | 0.0000 |
| GV1 | 2.70 | 78.8602 | 18.8715 | 1.5199 | 0.0000 | 0.3308 | 0.2925 | 0.0000 | 0.0250 | 0.1001 |
| GV3 | 2.70 | 78.7054 | 18.8345 | 1.5132 | 0.0000 | 0.3294 | 0.2925 | 0.0000 | 0.0250 | 0.3000 |
| HV0 | 3.80 | 74.3458 | 21.1947 | 0.7551 | 3.4068 | 0.0000 | 0.2926 | 0.0000 | 0.0050 | 0.0000 |
| HV1 | 3.80 | 74.2737 | 21.1741 | 0.7537 | 3.4006 | 0.0000 | 0.2926 | 0.0000 | 0.0050 | 0.1003 |
| HV3 | 3.80 | 74.1294 | 21.1330 | 0.7509 | 3.3880 | 0.0000 | 0.2926 | 0.0000 | 0.0050 | 0.3011 |
| IV0 | 2.60 | 79.0963 | 18.6116 | 1.5437 | 0.3317 | 0.0000 | 0.0000 | 0.3967 | 0.0200 | 0.0000 |
| IV1 | 2.60 | 79.0188 | 18.5934 | 1.5402 | 0.3309 | 0.0000 | 0.0000 | 0.3967 | 0.0200 | 0.1000 |
| IV3 | 2.60 | 78.8637 | 18.5569 | 1.5332 | 0.3294 | 0.0000 | 0.0000 | 0.3967 | 0.0200 | 0.3001 |
| JV0 | 2.60 | 79.1194 | 18.6170 | 1.5484 | 0.3327 | 0.0000 | 0.1100 | 0.2475 | 0.0250 | 0.0000 |
| JV1 | 2.60 | 79.0419 | 18.5988 | 1.5449 | 0.3319 | 0.0000 | 0.1100 | 0.2475 | 0.0250 | 0.1000 |
| JV3 | 2.60 | 78.8870 | 18.5624 | 1.5379 | 0.3304 | 0.0000 | 0.1100 | 0.2475 | 0.0250 | 0.2998 |
| KV0 | 2.60 | 79.1400 | 18.6219 | 1.5488 | 0.3328 | 0.0000 | 0.1832 | 0.1483 | 0.0250 | 0.0000 |
| KV1 | 2.60 | 79.0625 | 18.6037 | 1.5453 | 0.3320 | 0.0000 | 0.1832 | 0.1483 | 0.0250 | 0.1000 |
| KV3 | 2.60 | 78.9076 | 18.5672 | 1.5383 | 0.3305 | 0.0000 | 0.1832 | 0.1483 | 0.0250 | 0.2999 |

Upon completion of the dry-spun, spandex-polymer-composition tests, a series of tests were performed to investigate the impact of increasing the level of reacted-in APTS. The polymer compositions are reported in Table 5a below. All the polymers reported in Table 5 were prepared in a lab-scale, batch process. The APTS was added to the dilute capped glycol prior to the chain extension reaction. The glycol used for these experiments was a nominal 1,800 molecular weight PTMEG. The APTS used in this series of experiments was the Aldrich APTS (with a molecular weight of about 2,850 grams per mole).

All the polymer samples reported in Table 5 were spun as 40-denier, 3-filament yarns, at 2,500 feet per minute, under typical spandex dry-spinning conditions on a 1-threadline spinning machine. Residual DMAc level in yarn samples was less than 1%. A silicone containing finish applied to the yarn surface was in the range 3 to 5%.

TABLE 5

Increasing Level of Reacted-in APTS Lab Batch Polymer Recipes

| Test Part | NCO (%) | Glycol (%) | MDI (%) | EDA (%) | MPMD (%) | DEA (%) | DETA (%) | APTS (%) |
|---|---|---|---|---|---|---|---|---|
| P1 | 2.60 | 79.0202 | 18.5405 | 1.5423 | 0.3314 | 0.2926 | 0.0230 | 0.2500 |
| P2 | 2.60 | 78.8263 | 18.4951 | 1.5335 | 0.3295 | 0.2926 | 0.0230 | 0.5000 |
| P3 | 2.60 | 77.5037 | 18.3826 | 1.4864 | 0.3193 | 0.2779 | 0.0230 | 2.0071 |
| P4 | 2.60 | 75.9407 | 18.0120 | 1.4263 | 0.3064 | 0.2487 | 0.0230 | 4.0429 |
| P5 | 2.60 | 74.3962 | 17.6456 | 1.3592 | 0.2920 | 0.2414 | 0.0230 | 6.0426 |

Upon completion of the dry-spun, spandex-polymer-increased-level-of-reacted-in-APTS tests, a series of tests were performed to investigate the impact of decreasing the level of reacted-in APTS and the impact of spun-in MgSt. The polymer compositions are reported in Table 6 below were prepared in the TLCP with no spun-in PDMS. The APTS was added to the dilute capped glycol prior to the chain extension reaction. The glycol used for these experiments was a nominal 1,800 molecular weight PTMEG. The APTS used in this series of experiments was NH40D (with a molecular weight of about 2,750 grams per mole). Selected samples with spun-in MgSt were prepared from polymers with no reacted-in APTS. The MgSt was injected and mixed into the polymer spin solution after completion of the polymer synthesis and prior to spinning.

All the polymer samples reported in Table 6 were spun as 40-denier, 3-filament yarns, at a variety of spin speeds, under typical spandex dry-spinning conditions on round-cell or rectangular-cell spinning machines. Residual DMAc level in yarn samples was less than 1%. A silicone containing finish applied to the yarn surface was in the range 3 to 5%.

Upon completion of the dry-spun, spandex-polymer-decreased-level-of-reacted-in-APTS tests, a series of tests were performed to investigate the impact of reacted-in APTS and HATS with and without spun-in pigment additives on UV whiteness retention. The samples made without pigment additives had spun-in, 1.35% by weight of Triethylene glycol bis(3-tert-butyl-4-hydroxy-5-methylphenyl)propionate. The samples with pigment additives had spun-in, 1.35% by weight of Triethylene glycol bis(3-tert-butyl-4-hydroxy-5-methylphenyl)propionate, plus 0.17% by weight TiO2, plus 1.5% by weight of a huntite and hydromagnesite mixture. The polymer compositions are reported in Table 7 below. All the polymers reported in Table 7 were prepared in a lab-scale, batch process. The HATS was added to the glycol and diisocyante mixture to for the capped glycol prepolymer prior to chain extension reaction. The APTS was added to the dilute capped glycol prior to the chain extension reaction. The glycol used for these experiments was a nominal 1,800 molecular weight PTMEG. The HATS used in this series of experiments was the Aldrich HATS (with a molecular weight of about 5,600 grams per mole). The APTS used in this series of experiments was the Aldrich APTS (with a molecular weight of about 2,850 grams per mole).

All the polymer samples reported in Table 7 were spun as 40-denier, 3-filament yarns, at 2,500 feet per minute, under typical spandex dry-spinning conditions on a 1-threadline spinning machine. Residual DMAc level in yarn samples was less than 1%. A silicone containing finish applied to the yarn surface was in the range 3 to 5%.

TABLE 6

Decreasing Level of Reacted-in APTS Tech Lab CP Polymer Recipes

| Test Part | NCO (%) | Glycol (%) | MDI (%) | EDA (%) | MPMD (%) | DEA (%) | DETA (%) | APTS (%) | MgSt (%) |
|---|---|---|---|---|---|---|---|---|---|
| TL0 | 2.60 | 79.2268 | 18.5885 | 1.5386 | 0.3306 | 0.2926 | 0.0230 | 0.0000 | 0.00 |
| TL1 | 2.60 | 79.2268 | 18.5885 | 1.5386 | 0.3306 | 0.2926 | 0.0230 | 0.0000 | 0.50 |
| TL2 | 2.60 | 79.2268 | 18.5885 | 1.5386 | 0.3306 | 0.2926 | 0.0230 | 0.0000 | 0.25 |
| TL3 | 2.60 | 79.0052 | 18.6035 | 1.5440 | 0.3317 | 0.2926 | 0.0230 | 0.2000 | 0.00 |
| TL4 | 2.60 | 79.0826 | 18.6218 | 1.5475 | 0.3325 | 0.2926 | 0.0230 | 0.1000 | 0.00 |
| TL5 | 2.60 | 79.1213 | 18.6309 | 1.5493 | 0.3329 | 0.2926 | 0.0230 | 0.0500 | 0.00 |
| TL6 | 2.60 | 79.1408 | 18.6355 | 1.5501 | 0.3330 | 0.2926 | 0.0230 | 0.0250 | 0.00 |

TABLE 7

Reacted-in APTS and HATS Lab Batch Recipes for UV Whiteness Retention

| Test Part | NCO (%) | Glycol (%) | MDI (%) | EDA (%) | MPMD (%) | DEA (%) | DETA (%) | APTS (%) | HATS (%) | TiO2 |
|---|---|---|---|---|---|---|---|---|---|---|
| UV0 | 2.60 | 79.2206 | 18.5875 | 1.5566 | 0.3344 | 0.2779 | 0.0230 | 0.0000 | 0.0000 | Yes |
| UV1 | 2.60 | 79.2123 | 18.5856 | 1.5562 | 0.3343 | 0.2779 | 0.0230 | 0.0107 | 0.0000 | Yes |
| UV2 | 2.60 | 79.2012 | 18.5830 | 1.5557 | 0.3342 | 0.2779 | 0.0230 | 0.0250 | 0.0000 | Yes |
| UV3 | 2.60 | 79.1538 | 18.5984 | 1.5493 | 0.3329 | 0.2926 | 0.0230 | 0.0500 | 0.0000 | Yes |
| UV4 | 2.60 | 79.1150 | 18.5894 | 1.5475 | 0.3325 | 0.2926 | 0.0230 | 0.1000 | 0.0000 | Yes |
| UV5 | 2.60 | 79.0376 | 18.5711 | 1.5440 | 0.3317 | 0.2926 | 0.0230 | 0.2000 | 0.0000 | Yes |
| UV6 | 2.60 | 78.8033 | 18.5227 | 1.5376 | 0.3304 | 0.2816 | 0.0230 | 0.5014 | 0.0000 | Yes |
| UV7 | 2.60 | 77.6677 | 18.2558 | 1.5297 | 0.2398 | 0.2743 | 0.0230 | 2.0097 | 0.0000 | Yes |
| UV8 | 2.60 | 76.1339 | 17.8953 | 1.5001 | 0.1527 | 0.2670 | 0.0230 | 4.0280 | 0.0000 | Yes |
| UV9 | 2.60 | 78.3454 | 18.6633 | 1.5494 | 0.3329 | 0.2926 | 0.0250 | 0.0000 | 0.7914 | Yes |
| UV10 | 2.60 | 77.7586 | 18.4546 | 1.5494 | 0.3329 | 0.2926 | 0.0250 | 0.0000 | 1.5869 | Yes |
| UV11 | 2.60 | 78.7996 | 18.5218 | 1.5335 | 0.3295 | 0.2926 | 0.0230 | 0.5000 | 0.0000 | No |
| UV12 | 2.60 | 77.6670 | 18.2556 | 1.5256 | 0.2392 | 0.2852 | 0.0230 | 2.0044 | 0.0000 | No |
| UV13 | 2.60 | 76.1373 | 17.8961 | 1.4961 | 0.1523 | 0.2779 | 0.0230 | 4.0173 | 0.0000 | No |

2. Evaluation of Samples
Testing Methodology

The effectiveness of PDMS polymerized into the polymer backbone of spandex was determined by preparing:

A) a spandex polymer with: 1) no spun-in PDMS, 2) no spun-in MgSt, and 3) no polymerized-in PDMS;
B) a spandex polymer with spun-in PDMS only; and
C) a spandex polymer with spun-in MgSt only; and
D) a spandex polymer with polymerized-in PDMS only and with or without pigment additives.

The polymer samples were then spun, as 40-denier, three-filament yarn on a 1-threadline spinning machine or 40-denier, four-filament yarn on a 24-threadline round-cell spinning machine or 40-denier, three-filament yarn on a 24-threadline round-cell spinning machine, or 40-denier, three-filament yarn on a 24-threadline rectangular-cell spinning machine. During the spinning of the test polymers visual observations were made to determine the presence or absence of "flicking" in the coalescence jet, and the presence or absence of yarn sticking to the spin-cell wall.

Sample cakes of spun yarn were collected and the yarn tensile properties, filament cohesion, and along-end denier uniformity were measured. In the case of the continuous-polymerizer, 24-threadline spinning test the frequency of spinning breaks was recorded, finish free yarn samples were collected and tested for the presence or absence of PDMS as either a spun-in additive or a polymerized-in component of the polymer backbone, and for each polymer test part, samples the DMAc condensate from the exit of the spin process were collected and tested for the presence or absence of PDMS.

Testing Results

Results of the initial lab-scale, batch-process test are shown in Table 8. Test part A1 with spun-in PDMS only, exhibited no flicking in the coalescence jet and had acceptable fiber properties. Test part B1 with no spun-in PDMS, no spun-in MgSt and no polymerized-in PDMS exhibited flicking in the coalescence jet, and acceptable yarn properties. Test parts C1 and C2 with polymerized-in APTS (with a molecular weight of about 2,850) only, exhibited no flicking in the coalescence jet and acceptable yarn properties. Test part D1 with polymerized-in APTS (with a molecular weight of about 27,000) only, exhibited no flicking in the coalescence jet but had a relatively low, but acceptable, filament-to-filament cohesion ("COH") and a coefficient of denier variation ("CDV") above the acceptable limit. Test part E1 with polymerized-in HATS (with a molecular weight of about 5,600) only, exhibited no flicking in the coalescence jet and acceptable yarn properties.

From these results, it was apparent that:
1) polymer with spun-in PDMS only, exhibited no flicking in the coalescence jet;
2) polymer with spun-in MgSt only, exhibited no flicking in the coalescence jet;
3) polymer with polymerized-in PDMS only, resulted in no flicking in the coalescence jet; and
4) polymer with no spun-in PDMS, no spun-in MgSt and no polymerized-in PDMS exhibited flicking in the coalescence jet.

TABLE 8

Lab Batch Polymer, 1-Threadline Fiber Properties

| Test Part | HATS (%) | APTS (%) | PDMS (%) | Flicking in Jets | TEN (gf) | ELO (%) | TP2 (gf) | TM2 (gf) | COH | CDV |
|---|---|---|---|---|---|---|---|---|---|---|
| A1 | 0.0000 | 0.0000 | 0.50 | No | 51 | 512 | 5.6 | 1.02 | 8.4 | 15 |
| B1 | 0.0000 | 0.0000 | 0.00 | Yes | 49 | 498 | 5.8 | 1.08 | 8.9 | 14 |
| C1 | 0.0000 | 1.6096 | 0.00 | No | 42 | 495 | 5.4 | 1.08 | 6.5 | 15 |
| C2 | 0.0000 | 0.8115 | 0.00 | No | 46 | 502 | 6.4 | 1.05 | 7.4 | 16 |
| D1 | 0.0000 | 0.7645 | 0.00 | No | 43 | 482 | 7.4 | 1.10 | 5.2 | 25 |
| E1 | 0.7921 | 0.0000 | 0.00 | No | 46 | 487 | 7.0 | 1.11 | 6.8 | 14 |

Results of the scale-up TLCP test are shown in Tables 9a and 9b. The purpose of this test was to confirm the flicking in the coalescence jets results from the scouting test, to observe the presence or absence of yarn sticking to the spin-cell wall, to quantify the relative level of PDMS in the DMAc condensate, to quantify the relative level of PDMS in spun yarn, and to quantify spinning performance and measure fiber properties.

As shown in Table 9a, test part A2 with spun-in PDMS only, exhibited no flicking in the coalescence jets, no yarn sticking to the spin-cell wall, and no spin breaks. Test part B2, with no spun-in PDMS, no spun-in MgSt, and no polymerized-in PDMS, exhibited flicking in the coalescence jets, yarn sticking to the spin-cell wall, and 4 spin breaks per day. Test parts C3, C4, and C5, with polymerized-in PDMS only, exhibited no flicking in the coalescence jets, no yarn sticking to the spin-cell wall, and no spin breaks.

Analysis of test part A2 indicated the presence of 901 parts per million of PDMS in DMAc condensate and 12.3 parts per million of PDMS in finish-free yarn. Analysis of test part B2 indicated the presence of less than 1 part per million of PDMS in DMAc condensate and 2.9 parts per million of PDMS in finish-free yarn. Analysis of test part C3 indicated the presence of less than 1 part per million of PDMS in DMAc condensate and 29.1 parts per million of PDMS in finish-free yarn. Analysis of test part C4 indicated the presence of less than 1 part per million of PDMS in DMAc condensate and 18.9 parts per million of PDMS in finish-free yarn. Analysis of test part C5 indicated less than 1 part per million of PDMS in the DMAc condensate and 11.4 parts per million of PDMS in finish-free yarn.

These results clearly demonstrate the benefits of polymerization of PDMS into the polymer backbone, namely, 1) no flicking in the coalescence jets, 2) acceptable spin breaks, 3) no yarn sticking to the spin-cell wall, and 4) no PDMS in DMAc condensate due to permanent attachment of the PDMS to the polymer chain.

TABLE 9a

Tech Lab CP Polymer, 24-Threadline Spinning Analysis

| Test Part | APTS (%) | PDMS (%) | Flicking in Jets | Yarn Sticking to cell wall | Spin Breaks per day | DMAc Cond. PDMS (ppm) | Fin.-Free Yarn PDMS (ppm) |
|---|---|---|---|---|---|---|---|
| A2 | 0.0000 | 0.50 | No | No | 0 | 901 | 12.3 |
| B2 | 0.0000 | 0.00 | Yes | Yes | 4 | <1 | 2.9 |
| C3 | 0.4000 | 0.00 | No | No | 0 | <1 | 29.1 |
| C4 | 0.2400 | 0.00 | No | No | 0 | <1 | 18.9 |
| C5 | 0.1200 | 0.00 | No | No | 0 | <1 | 11.4 |

The fiber tensile properties, as shown in Table 9b, are acceptable for all test parts with the exception of test part B2 which has unacceptably high CDV, due to the high frequency of flicking in the coalescence jets for that test part.

TABLE 9b

Tech Lab CP Polymer, 24-Threadline Fiber Properties

| Test Part | APTS (%) | PDMS (%) | TEN (gf) | ELO (%) | TP2 (gf) | TM2 (gf) | COH | CDV |
|---|---|---|---|---|---|---|---|---|
| A2 | 0.0000 | 0.50 | 42 | 490 | 7.0 | 1.11 | 6.6 | 16 |
| B2 | 0.0000 | 0.00 | 41 | 494 | 6.8 | 1.08 | 6.3 | 23 |
| C3 | 0.4000 | 0.00 | 46 | 474 | 7.1 | 1.11 | 6.9 | 14 |
| C4 | 0.2400 | 0.00 | 44 | 486 | 6.9 | 1.12 | 6.9 | 15 |
| C5 | 0.1200 | 0.00 | 43 | 480 | 7.1 | 1.09 | 7.6 | 15 |

Results from the Vendor APTS Types Lab Batch Polymer series are shown in Table 10. The purpose of this test was to determine the performance of different vendor's APTS types made at a nominal 0.3 and 0.1% reactant level.

The results of these experiments indicate that a variety of vendors provide different types of APTS which give good spinning performance, acceptable yarn properties, and no flicking in the jets. The control test part, V0 (made with no spun-in PDMS, no spun-in MgSt, and no polymerized-in APTS) exhibited flicking in the coalescence jets. Test samples V1, V2, V3, V4, V5, V6, V7, and V8 (C6252, C5379, NH40D, and Aldrich supplied APTS at a nominal 0.3% and 0.1% reactant level, respectively) gave acceptable results. These samples provided acceptable yarn properties and no flicking in the coalescence jets. Test samples V9 and V10 (DMSA15 APTS at a nominal 0.3% and 0.1% reactant level, respectively) did not give acceptable results, likely due in part to the presence of impurities in the DMSA15. These test parts exhibited flicking in the jets with no improvement over the control.

TABLE 10

Vendor APTS Types Lab Batch Polymer, 1-Threadline Fiber Properties

| Test Part | APTS Type | TEN (gf) | ELO (%) | TP2 (gf) | TM2 (gf) | SET (%) | COH | Flicking in Jet |
|---|---|---|---|---|---|---|---|---|
| V0 |  | 46.1 | 490 | 5.20 | 1.14 | 23.0 | 9.2 | Yes |
| V1 | C6252 | 44.8 | 502 | 4.85 | 1.07 | 23.8 | 9.7 | No |
| V2 | C6252 | 46.7 | 506 | 5.08 | 1.12 | 22.8 | 9.4 | No |
| V3 | C5379 | 50.9 | 527 | 4.65 | 1.09 | 24.0 | 8.9 | No |
| V4 | C5379 | 43.6 | 482 | 5.49 | 1.12 | 23.9 | 7.9 | No |
| V5 | NH40D | 36.4 | 507 | 4.66 | 1.17 | 24.6 | 8.2 | No |
| V6 | NH40D | 45.1 | 489 | 6.08 | 1.17 | 20.1 | 5.8 | No |
| V7 | Aldrich | 49.4 | 496 | 5.11 | 1.14 | 21.8 | 4.2 | No |

TABLE 10-continued

Vendor APTS Types Lab Batch Polymer,
1-Threadline Fiber Properties

| Test Part | APTS Type | TEN (gf) | ELO (%) | TP2 (gf) | TM2 (gf) | SET (%) | COH | Flicking in Jet |
|---|---|---|---|---|---|---|---|---|
| V8 | Aldrich | 47.1 | 501 | 5.20 | 1.12 | 22.2 | 8.7 | No |
| V9 | DMSA15 | 41.2 | 492 | 4.71 | 1.07 | 21.4 | 9.5 | Yes |
| V10 | DMSA15 | 50.5 | 502 | 5.16 | 1.19 | 21.8 | 9.1 | Yes |

Results from the Varying Spandex Polymer Composition Lab Batch Polymer series are shown in Table 11. The purpose of this test was to determine the performance of a series of spandex-polymer-compositions by varying % NCO, chain extender/coextender type (EDA, MPMD, PDA), and chain extender/coextender mole ratio, terminator type (DEA, CHA) and level, and APTS level.

The results of these experiments indicate that fibers made from a variety of polymer compositions with no spun-in PDMS, no spun-in MgSt, and no polymerized-in APTS, exhibit flicking in the coalescence jets. In contrast, fibers made from a variety of polymer compositions with APTS reacted into the polymer backbone at a nominal 0.3 and 0.1% reactant level exhibit no flicking in the coalescence jets and acceptable yarn properties.

Thus, the APTS is found to be effective over a wide range of % NCO (about 2.2 to about 3.8%), extender/coextender levels and types (about 1.56 to about 0.75% EDA and about 0.68 to 0% MPMD and about 0.33 to about 0% PDA), and terminator levels and types (about 0.31 to about 0% DEA and about 0.4 to about 0% CHA). A few exceptions were observed over the course of this experimental work, namely: 1) test part IV1 did not spin well and was excluded from the analysis, 2) JV0 with no reacted-in APTS did not exhibit flicking in the jets, and 3) FV1 with 0.1% reacted-in APTS did exhibit flicking in the jets.

TABLE 11

Varying Spandex Polymer Composition Lab
Batch Polymer, 1-TL Fiber Properties

| Test Part | APTS (%) | TEN (gf) | ELO (%) | TP2 (gf) | TM2 (gf) | SET (%) | COH | Flicking in Jet |
|---|---|---|---|---|---|---|---|---|
| AV0 | 0.0000 | 48.2 | 541 | 4.79 | 1.14 | 22.1 | 7.5 | Yes |
| AV1 | 0.1001 | 49.0 | 540 | 4.81 | 1.08 | 21.7 | 5.9 | No |
| AV3 | 0.3000 | 39.3 | 480 | 3.42 | 0.96 | 20.8 | 7.8 | No |
| BV0 | 0.0000 | 52.0 | 562 | 4.64 | 1.14 | 21.9 | 9.2 | Yes |
| BV1 | 0.1002 | 46.7 | 556 | 3.84 | 0.96 | 21.5 | 7.8 | No |
| BV3 | 0.3005 | 51.1 | 564 | 3.81 | 0.99 | 21.7 | 6.2 | No |
| CV0 | 0.0000 | 50.7 | 548 | 5.20 | 1.12 | 22.0 | 9.6 | Yes |
| CV1 | 0.0960 | 40.4 | 555 | 4.92 | 1.07 | 23.1 | 5.5 | No |
| CV3 | 0.2877 | 37.2 | 542 | 5.30 | 1.09 | 22.8 | 8.5 | No |
| DV0 | 0.0000 | 50.3 | 510 | 5.08 | 1.12 | 21.7 | 7.9 | Yes |
| DV1 | 0.1000 | 49.0 | 509 | 5.14 | 1.14 | 21.3 | 9.9 | No |
| DV3 | 0.2992 | 49.1 | 516 | 5.14 | 1.15 | 21.4 | 9.1 | No |
| EV0 | 0.0000 | 46.1 | 490 | 5.20 | 1.14 | 23.0 | 9.2 | Yes |
| EV1 | 0.0886 | 47.1 | 501 | 5.20 | 1.12 | 22.2 | 8.7 | No |
| EV3 | 0.2633 | 49.4 | 496 | 5.11 | 1.14 | 21.8 | 4.2 | No |
| FV0 | 0.0000 | 49.4 | 483 | 5.59 | 1.10 | 21.8 | 6.8 | Yes |
| FV1 | 0.1000 | 54.1 | 487 | 5.69 | 1.09 | 21.5 | 7.9 | Yes |
| FV3 | 0.2998 | 52.7 | 496 | 5.33 | 1.11 | 20.7 | 9.8 | No |
| GV0 | 0.0000 | 53.0 | 509 | 5.88 | 1.19 | 27.1 | 5.9 | Yes |
| GV1 | 0.1001 | 46.4 | 497 | 7.08 | 1.19 | 24.7 | 3.5 | No |
| GV3 | 0.3000 | 51.0 | 488 | 6.53 | 1.22 | 25.0 | 3.2 | No |
| HV0 | 0.0000 | 32.2 | 415 | 3.97 | 0.97 | 19.5 | 8.1 | Yes |
| HV1 | 0.1003 | 29.5 | 395 | 4.80 | 0.99 | 16.8 | 9.5 | No |
| HV3 | 0.3011 | 45.4 | 427 | 5.20 | 1.04 | 15.7 | 8.6 | No |
| IV0 | 0.0000 | 36.6 | 526 | 5.07 | 1.02 | 27.1 | 6.8 | Yes |
| IV1 | 0.1000 | | | | | | | |
| IV3 | 0.3001 | 51.6 | 552 | 5.19 | 1.07 | 25.3 | 9.4 | No |
| JV0 | 0.0000 | 55.0 | 543 | 5.15 | 1.05 | 24.2 | 8.6 | No |
| JV1 | 0.1000 | 49.8 | 533 | 5.12 | 1.08 | 22.7 | 8.2 | No |
| JV3 | 0.2998 | 55.4 | 514 | 5.42 | 1.10 | 23.0 | 8.7 | No |
| KV0 | 0.0000 | 54.8 | 495 | 6.18 | 1.19 | 22.3 | 7.8 | Yes |
| KV1 | 0.1000 | 40.1 | 456 | 5.94 | 1.19 | 22.2 | 9.8 | No |
| KV3 | 0.2999 | 48.7 | 482 | 5.75 | 1.14 | 22.7 | 9.9 | No |

Results from the series of experiments studying the Impact of Increasing Level of Reacted-in APTS are shown in Table 12. The purpose of this test was to determine the performance of a series of spandex-polymer-compositions by varying the APTS level.

The results of these experiments indicate that fibers made from polymer compositions with no spun-in PDMS, no spun-in MgSt, and polymerized-in APTS, exhibited no flicking in the coalescence jets. Fibers made from polymer compositions with APTS reacted into the polymer backbone from 0.25% to less than or equal to 6.04% level exhibited acceptable yarn properties and acceptable COH. Fibers made from polymer compositions with APTS reacted into the polymer backbone at 4.04% level had borderline acceptable CDV and at 6.04% level had CDV above the acceptable limit. Thus, the polymerized-in APTS is found to be effective in eliminating flicking in the jets, give acceptable yarn properties, and provide acceptable COH up to the 6% level.

TABLE 12

Impact of Increasing Level of Reacted-in APTS

| Test Part | APTS (%) | TEN (gf) | ELO (%) | TP2 (gf) | TM2 (gf) | SET (%) | COH | CDV | Flicking in Jet |
|---|---|---|---|---|---|---|---|---|---|
| P1 | 0.25 | 47.3 | 513 | 4.98 | 1.13 | 20.9 | 6.6 | 12 | No |
| P2 | 0.50 | 43.9 | 493 | 4.76 | 0.96 | 24.3 | 4.1 | 17 | No |
| P3 | 2.00 | 41.4 | 464 | 4.94 | 1.11 | 22.2 | 8.0 | 15 | No |
| P4 | 4.04 | 45.2 | 495 | 4.63 | 1.10 | 22.7 | 8.0 | 21 | No |
| P5 | 6.04 | 45.5 | 471 | 5.59 | 1.12 | 21.9 | 7.0 | 29 | No |

Results from the series of experiments studying the Impact of Decreasing Level of Reacted-in APTS are shown in Table 13a for the round-cell spinning machine and in table 13b for the rectangular-cell spinning machine. The purpose of this test was to determine the performance of a series of spandex-polymer-compositions by varying the APTS level.

The results of the round-cell spinning experiments indicate that fibers made with no spun-in PDMS, no spun-in MgSt, and no polymerized-in APTS had unacceptable spinning performance with flicking in the coalescence jets and sticking to the cell wall. Fibers made from a variety of polymer compositions with no spun-in PDMS, no spun-in MgSt, and polymerized-in APTS, exhibited no flicking in the coalescence jets. Fibers made from polymer compositions with greater than or equal to 0.025% polymerized-in APTS gave acceptable yarn properties and polymer compositions with greater than 0.025% polymerized-in APTS gave acceptable spinning performance. While the fiber sample made from the polymer composition with 0.025% polymerized-in APTS had acceptable yarn properties but poor spinning performance as yarn would stick to the spin-cell wall. There was no evidence of pre-mature filament twinning in any of these test parts.

TABLE 13a

Impact of Decreasing Level of Reacted-in APTS on Round-Cell Spinning

| Test Part | APTS (%) | TEN (gf) | ELO (%) | TP2 (gf) | TM2 (gf) | SET (%) | COH | CDV | Jet P (psi) | Flicking in Jets | Yarn Sticking to cell wall |
|---|---|---|---|---|---|---|---|---|---|---|---|
| TL0 | 0.000 | 39.4 | 476 | 6.55 | 1.09 | 23.2 | 7.7 | 15.5 | 3.5 | Yes | Yes |
| TL3 | 0.200 | 49.2 | 497 | 6.01 | 1.14 | 21.9 | 9.2 | 13.8 | 3.5 | No | No |
| TL4 | 0.100 | 45.8 | 494 | 6.03 | 1.14 | 22.1 | 8.4 | 13.1 | 3.5 | No | No |
| TL5 | 0.050 | 44.1 | 484 | 6.05 | 1.09 | 23.0 | 9.7 | 12.3 | 3.5 | No | No |
| TL6 | 0.025 | 41.4 | 485 | 5.81 | 1.10 | 22.2 | 9.1 | 14.2 | 3.5 | No | Yes |

The results of the rectangular-cell spinning experiments indicate that fibers made with no spun-in PDMS, no spun-in MgSt, and no polymerized-in APTS had unacceptable spinning performance with flicking in the coalescence jets (but no sticking to the cell wall) and above goal CDV. Fibers made with no spun-in PDMS, with spun-in MgSt and no polymerized-in APTS had acceptable spinning performance with no flicking in the jets and no sticking to the cell wall. Fibers made from polymer compositions with no spun-in PDMS, no spun-in MgSt, and polymerized-in APTS, exhibited no flicking in the coalescence jets and no sticking to the cell wall. Fibers made from polymer compositions with greater than or equal to 0.025% polymerized-in APTS gave acceptable yarn properties and spinning performance. There was no evidence of pre-mature filament twinning in any of these test parts. These test results indicate that sticking to the cell wall is a concern for the round-cell spinning machine but not for the rectangular-cell spinning machine. The rectangular-cell spinning machine has greater distance between the spinning threadline and the heated spin-cell wall versus the round-cell spinning machine. Thus, the polymerized-in APTS is effective at eliminating flicking in the jets, and provides good spinning performance and acceptable fiber properties at the 0.025% level.

TABLE 13b

Impact of Decreasing Level of Reacted-in APTS on Rectangular-Cell Spinning

| Test Part | APTS (%) | MgSt (%) | TEN (gf) | ELO (%) | TP2 (gf) | TM2 (gf) | SET (%) | COH | CDV | Flicking in Jets | Yarn Sticking to cell wall |
|---|---|---|---|---|---|---|---|---|---|---|---|
| TL0 | 0.000 | 0.00 | 39.0 | 463 | 7.56 | 1.16 | 23.0 | 5.0 | 23.6 | Yes | No |
| TL1 | 0.000 | 0.50 | 37.1 | 480 | 7.20 | 1.07 | 23.9 | 5.3 | 14.2 | No | No |

TABLE 13b-continued

Impact of Decreasing Level of Reacted-in APTS on Rectangular-Cell Spinning

| Test Part | APTS (%) | MgSt (%) | TEN (gf) | ELO (%) | TP2 (gf) | TM2 (gf) | SET (%) | COH | CDV | Flicking in Jets | Yarn Sticking to cell wall |
|---|---|---|---|---|---|---|---|---|---|---|---|
| TL2 | 0.000 | 0.25 | 35.8 | 479 | 7.26 | 1.07 | 24.0 | 5.9 | 15.6 | No | No |
| TL3 | 0.200 | 0.00 | 42.1 | 471 | 5.99 | 1.14 | 22.5 | 7.1 | 15.2 | No | No |
| TL4 | 0.100 | 0.00 | 41.4 | 471 | 6.02 | 1.14 | 22.4 | 6.6 | 14.8 | No | No |
| TL5 | 0.050 | 0.00 | 39.4 | 464 | 6.06 | 1.13 | 22.7 | 8.2 | 14.3 | No | No |
| TL6 | 0.025 | 0.00 | 40.2 | 468 | 5.80 | 1.13 | 22.6 | 7.9 | 14.5 | No | No |

Upon completion of the spinning performance test on the impact of decreasing level of APTS it was decided to test the yarn samples for thermal recovery force loss or "power retention" by subjecting the yarn samples to heat treatment while being held in a stretched state. The fiber change in recovery force was determined by comparing the as spun fiber recovery force to the fiber recovery force after stretching the yarn 3.0×, heating is for 2 minutes at 190° C. and then steam treating it at 130° C. for 30 minutes and then boiling in water for 30 minutes. The results are given in Table 13c show that a greater decrease in recovery force occurs, following thermal treatment, in yarns with spun-in MgSt and no polymerized-in APTS than with fibers made from polymer with polymerized-in APTS and no spun-in MgSt.

TABLE 13c

Change in Fiber Recovery Force following Thermal Treatment while Stretched 3x

| Test Part | APTS (%) | MgSt (%) | Initial Recovery Force (gf/den) | Final Recovery Force (gf/den) | Change in Recovery Force (%) |
|---|---|---|---|---|---|
| TL0 | 0.000 | 0.00 | 0.0253 | 0.0245 | −3.0 |
| TL1 | 0.000 | 0.50 | 0.0245 | 0.0209 | −14.7 |
| TL2 | 0.000 | 0.25 | 0.0250 | 0.0219 | −12.4 |
| TL3 | 0.200 | 0.00 | 0.0256 | 0.0241 | −5.8 |
| TL4 | 0.100 | 0.00 | 0.0253 | 0.0237 | −6.3 |

A greater decrease in fiber recovery force due to thermal treatment while under stretch indicates greater loss of fabric recovery power, and greater fabric lean out following heat setting and dyeing processing steps. Thus, it would be expected that yarns spun from polymer with the polymerized-in APTS would provide yarns with superior fabric performance (greater recovery per weight of spandex) following mill fabric processing steps versus yarns made with spun-in MgSt.

Fiber property results from the series of experiments studying the Impact Reacted-in of reacted-in APTS and HATS on Whiteness Retention are shown in Table 14a. The purpose of this test was to determine the yarn whiteness retention of a series of spandex-polymer-compositions by varying the APTS and HATS levels.

The results of these experiments indicate that fibers made from polymer compositions with no spun-in PDMS, no spun-in MgSt, and no polymerized-in APTS or HATS, exhibited flicking in the coalescence jets. Fibers made from polymer compositions with no spun-in PDMS, no spun-in MgSt, and with polymerized-in APTS or HATS from a range of 0.01% to less than or equal to 4.02% exhibited no flicking in the coalescence jets. Fibers made from polymer compositions with APTS or HATS reacted into the polymer backbone from 0.01% to less than or equal to 4.02% level both with and without pigment additives exhibited acceptable yarn tensile properties and acceptable COH and acceptable CDV. Thus, the polymerized-in APTS or HATS is found to be effective in eliminating flicking in the jets, give acceptable yarn properties, and provide acceptable COH and CDV from 0.01% up to the 4% level both with and without pigment additives.

TABLE 14a

Impact of Increasing Level of Reacted-in APTS and HATS on Fiber Properties

| Test Part | APTS (%) | HATS (%) | TiO2 | TEN (gf) | ELO (%) | TP2 (gf) | TM2 (gf) | SET (%) | COH | CDV | Flicking in Jet |
|---|---|---|---|---|---|---|---|---|---|---|---|
| UV0 | 0.0000 | 0.0000 | Yes | 37.6 | 473 | 4.91 | 1.13 | 22.3 | 9.1 | sample breaks | Yes |
| UV1 | 0.0107 | 0.0000 | Yes | 38.2 | 483 | 4.92 | 1.13 | 22.0 | 8.5 | 30 | No |
| UV2 | 0.0250 | 0.0000 | Yes | 43.0 | 486 | 5.10 | 1.18 | 21.5 | no data | 31 | No |
| UV3 | 0.0500 | 0.0000 | Yes | 36.3 | 478 | 4.72 | 1.11 | 22.6 | 8.9 | 11 | No |
| UV4 | 0.1000 | 0.0000 | Yes | 37.6 | 495 | 4.81 | 1.16 | 22.6 | 9.3 | 10 | No |
| UV5 | 0.2000 | 0.0000 | Yes | 39.3 | 479 | 4.85 | 1.13 | 23.0 | 9.1 | 15 | No |
| UV6 | 0.5014 | 0.0000 | Yes | 35.3 | 448 | 5.45 | 1.15 | 22.0 | 7.8 | 18 | No |
| UV7 | 2.0097 | 0.0000 | Yes | 47.0 | 491 | 5.07 | 1.14 | 23.3 | 7.8 | 18 | No |
| UV8 | 4.0280 | 0.0000 | Yes | 32.7 | 475 | 4.79 | 1.07 | 24.7 | 7.8 | 18 | No |
| UV9 | 0.0000 | 0.7914 | Yes | 36.2 | 465 | 6.14 | 1.08 | 24.1 | 8.2 | 8 | No |
| UV10 | 0.0000 | 1.5869 | Yes | 35.1 | 468 | 6.18 | 1.06 | 23.3 | 6.8 | 10 | No |
| UV11 | 0.5000 | 0.0000 | No | 40.8 | 469 | 5.09 | 1.21 | 22.0 | 8.8 | 17 | No |
| UV12 | 2.0044 | 0.0000 | No | 44.2 | 484 | 4.80 | 1.13 | 23.0 | 9.1 | 17 | No |
| UV13 | 4.0173 | 0.0000 | No | 50.6 | 514 | 4.69 | 1.13 | 22.5 | 8.1 | 21 | No |

The samples listed in Table 14a were evaluated for whiteness retention in an Atlas UV Weather-Ometer after 12 hours of exposure to a Xenon UV lamp. Fiber samples were wound on cards, and heat set, scoured and mock dyed. Then the samples were placed on a Datacolor 650 Spectrophotometer and measured for initial whiteness level (using the Bat Gant-Griesser Whiteness formula). Then the cards were hung in the weatherometer and exposed to the UV light source for 12 hours. Then the samples were placed on the spectrophotometer and measured for final whiteness level (using the Bat-Gant-Griesser Whiteness formula). The whiteness retention was calculated by subtracting the initial whiteness value from the final whiteness value. The smaller the difference between the final and initial whiteness values the greater the whiteness retention. The results of the whiteness retention tests are given in Table 14b and shown in Plot 1.

TABLE 14b

Impact of Increasing Level of Reacted-in APTS and HATS on Whiteness Retention

| Test Part | APTS (%) | HATS (%) | TiO2 | Change in Whiteness |
|---|---|---|---|---|
| UV0 | 0.0000 | 0.0000 | Yes | −30 |
| UV1 | 0.0107 | 0.0000 | Yes | −34 |
| UV2 | 0.0250 | 0.0000 | Yes | −22 |
| UV3 | 0.0500 | 0.0000 | Yes | −28 |
| UV4 | 0.1000 | 0.0000 | Yes | −30 |
| UV5 | 0.2000 | 0.0000 | Yes | −25 |
| UV6 | 0.5014 | 0.0000 | Yes | −20 |
| UV7 | 2.0097 | 0.0000 | Yes | −21 |
| UV8 | 4.0280 | 0.0000 | Yes | −18 |
| UV9 | 0.0000 | 0.7914 | Yes | −21 |
| UV10 | 0.0000 | 1.5869 | Yes | −17 |
| UV11 | 0.5000 | 0.0000 | No | −22 |
| UV12 | 2.0044 | 0.0000 | No | −25 |
| UV13 | 4.0173 | 0.0000 | No | −18 |

These results of Table 14b and FIG. 1 indicate that with 0.5% to 4% reacted in APTS or HATS with or without pigment additives have superior whiteness retention over yarn samples with 0.5% to 0% reacted-in APTS or HATS. The yarn samples with reacted in APTS or HATS, from 0.5 to 4%, indicated an improvement of roughly 10 units of whiteness retention versus samples with no reacted-in APTS or HATS. From these data, the whiteness retention benefit of reacted-in APTS or HATS appears to level off above 0.5%

While there have been described what are presently believed to be the certain desirable embodiments of the invention, those skilled in the art will realize that changes and modifications may be made thereto without departing from the spirit of the invention, and it is intended to include all such changes and modifications as fall within the true scope of the invention.

The invention claimed is:

1. A method of making polyurethane or polyurethane urea strands containing siloxane in the polyurethane or polyurethane urea backbone comprising the following steps:
  (a) mixing poly(tetramethylene ether) glycol with methylene diphenyl diisocyanate to form a prepolymer;
  (b) reacting aminopropyl-terminated polydimethylsiloxane with the prepolymer to form a siloxane-reacted prepolymer;
  (c) reacting the siloxane-reacted prepolymer with ethylenediamine to form a spinning solution; and
  (d) dry spinning the spinning solution to form polyurethane or polyurethane urea strands,
  wherein the polyurethane or polyurethane urea strands comprise from about 0.5% to 4% of siloxane by weight based on the weight of the polyurethane or polyurethane urea strands, and
  wherein the aminopropyl-terminated polydimethylsiloxane has a molecular weight between about 1,460 and about 5,600 grams per mole.

2. A method according to claim 1, wherein the siloxane is free of any urethane radical.

3. A method according to claim 1, further comprising the step of diluting the prepolymer with dimethylacetamide prior to step (b).

* * * * *